United States Patent [11] 3,631,403

[72] Inventors Einar Asbo
Castro Valley;
Joseph R. Herr, Los Altos Hills; Jerry W. Sublett, Newark, all of Calif.
[21] Appl. No. 855,904
[22] Filed Sept. 8, 1969
[45] Patented Dec. 28, 1971
[73] Assignee The Singer Company
New York, N.Y.

[54] RETAIL SALES TRANSACTION TERMINAL
16 Claims, 18 Drawing Figs.

[52] U.S. Cl. ........ 340/172.5
[51] Int. Cl. ........ G06f 15/02, G06f 15/20
[50] Field of Search ........ 340/172.5, 152, 337; 235/1, 2, 7 R, 92 DP, 130 R, 145 R

[56] References Cited

UNITED STATES PATENTS

| | | | |
|---|---|---|---|
| 2,883,255 | 4/1959 | Anderson | 340/172.5 X |
| 3,353,163 | 11/1967 | Soule, Jr. et al. | 340/172.5 |
| 3,533,076 | 10/1970 | Perkins et al. | 340/172.5 |
| 2,883,106 | 4/1959 | Cornwell et al. | 340/172.5 X |
| 3,105,636 | 10/1963 | Greene | 340/172.5 X |
| 3,302,189 | 1/1967 | Korkowski et al. | 340/172.5 |
| 3,308,439 | 3/1967 | Tink et al. | 340/172.5 |
| 3,380,031 | 4/1968 | Clayton et al. | 340/172.5 |
| 3,407.387 | 10/1968 | Looschen et al. | 340/152 |
| 3,495,221 | 2/1970 | Herendeen | 340/172.5 |
| 3,504,346 | 3/1970 | Parsons et al. | 340/172.5 |
| 3,508,205 | 4/1970 | Kubie | 340/172.5 |

*Primary Examiner*—Paul J. Henon
*Assistant Examiner*—Harvey E. Springborn
*Attorneys*—Patrick J. Schlesinger, Charles R. Lepchinsky, R. Perry Shipman and Jay M. Cantor

ABSTRACT: A data input and function-directing terminal in the form of a point of sale transaction device having manually operable numerical and function specifying keys, and a data processor comprised of a read-only-memory, a set of data-handling registers and a read/write memory for manipulation of data between the .erminal and various ones of a plurality of input/output devices according to a sequence of operator actions that are supervised by a fixed program in the read-only-memory, and variable program that may be entered manually into the processor.

INVENTORS.
EINAR L. ASBO
JOSEPH R. HERR
JERRY W. SUBLETT
BY
R. Perry Shipman
AGENT.

Patented Dec. 28, 1971 3,631,403

9 Sheets-Sheet 5

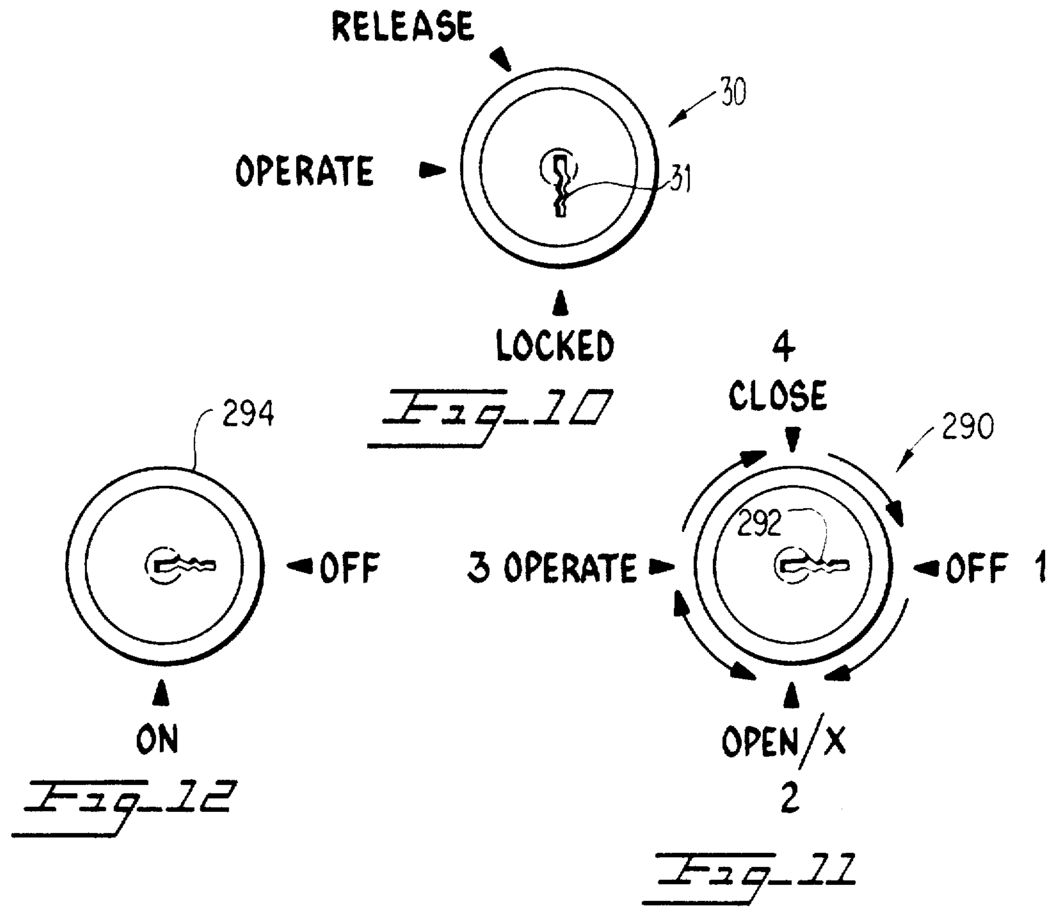
FIG. 10, FIG. 11, FIG. 12
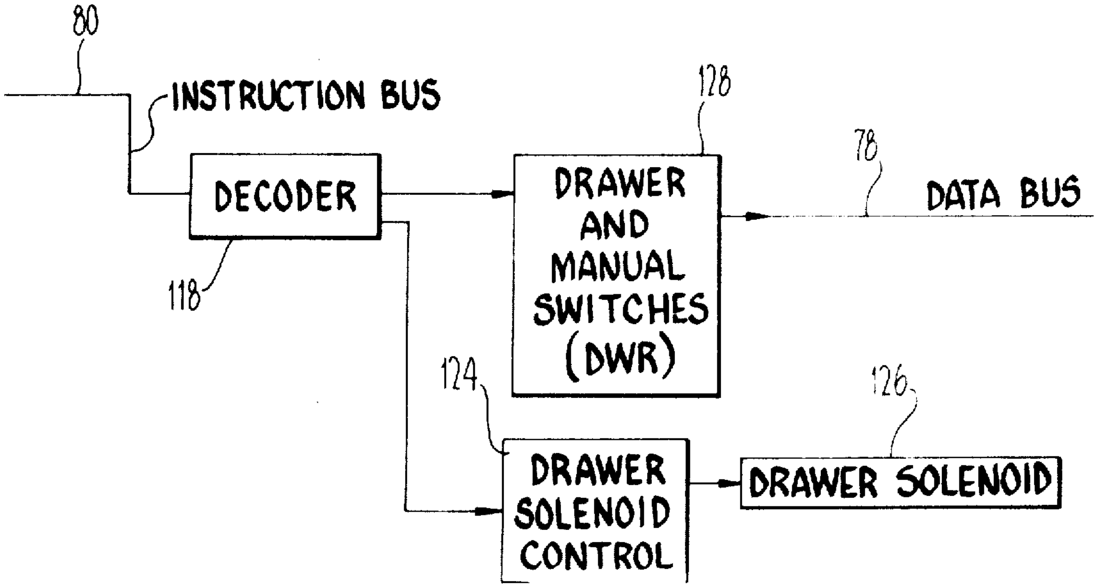

Patented Dec. 28, 1971 3,631,403

9 Sheets-Sheet 8

RETAIL SALES TRANSACTION TERMINAL

BACKGROUND

1. Field of Invention

This invention pertains to a data entry and transmission system, and more particularly concerns a data-handling system having a set of elementary data-operating elements, and a set of data manipulation control signals for accepting, operating on, and manipulating data between an input terminal and any of various peripheral devices.

2. Prior Art

In the past, there have been developed data transaction or manipulation systems of the type wherein a single input terminal including numerical entry keys and function-specifying keys are coupled with a data processor which, in turn, is coupled with one or more input/output devices, commonly called peripherals. In such prior art systems, the data processor has been of the complex type wherein a very large number of interconnected elements are required to execute the various commands or functions required.

Further, in such prior art systems, operation or execution of the next step in a sequence of steps frequently is dependent upon the successful operation of an accessed peripheral. Thus, if such accessed peripheral is in a nonoperative condition, the entire system is rendered nonoperative. This is not desirable for a variety of reasons, among which is the fact that new data to be fed into the system cannot or should not wait until the peripheral becomes operative.

SUMMARY

Briefly described, one preferred embodiment of the present invention is achieved as a point of sale transaction system, wherein an operator's, or input, terminal includes a set of manually operable numerical or decimal digit keys, and a plurality of manually operable function-initiating keys, a printing unit, a set of status-indicating lamps including a number display, a set of function key illuminating lamps, a cash drawer of the type commonly associated with a "cash register," and data-handling and control units including a forwarding unit for transmitting and receiving data between the input terminal and a relatively remote data collection device. The data collection device may be a source of customer credit status information capable of transmitting credit status information to the input terminal upon request from the input terminal.

The data-handling and control units (hereinafter collectively termed operator's terminal) includes a plurality of data-receiving and storage registers, an arithmetic unit, a sequence-directing unit, a read/write memory, and controls for the manipulation and operation of data between the various parts of the system.

The sequence-directing unit stores a plurality of data-manipulating and function-directing control signals which are utilized to supervise the execution of the various data manipulations and arithmetic operations throughout the system. The sequence-directing unit is likened to a read-only-memory having a plurality of storage locations or address and each location having an instruction stored therein of the type usually associated with a computer, such as, for example, unconditional branch, conditional branch, etc.

The read/write memory serves as a unit for storing data, which data may be indicative of alphanumeric symbols to be printed by the printer and to be transmitted to an external device if such be attached to the basic system. Further, with the present invention, various codes may be entered by manual operation of the digit keys entered into the read/write memory to define desired operating characteristics and requirements of the various function keys. The sequence-directing unit utilizes these codes in the normal sequence of events. Thus, management can "program" the operating sequence and requirements of the various data transactions or entries to be made by the ordinary operator, a sales clerk, for example.

It is therefore an object of the present invention to provide an improved data-handling system.

Another object of the present invention is to provide an improved point of transaction system.

Yet another object of the present invention is to provide a novel and improved arrangement for handling data received from a manually operable input means.

The features of novelty that are considered characteristic of this invention are set forth with particularity in the appended claims. The organization and method of operation of the invention may best be understood from the following description when read in connection with the accompanying drawings.

BRIEF DESCRIPTION OF THE DRAWINGS

FIG. 7 is a simplified logic block diagram of the keyboard unit of the present invention.

FIG. 10 is an enlarged view of the cash drawer lock of the operator's terminal of FIG. 1.

FIG. 11 is an enlarged view of the mode control switch of the operator's terminal of FIG. 1.

FIG. 12 is an enlarged view of the program control switch of the operator's terminal of FIG. 1.

FIG. 13 is a simplified logic block diagram of the switches and cash drawer unit of the present invention.

DESCRIPTION OF A PREFERRED EMBODIMENT

Figure 1:
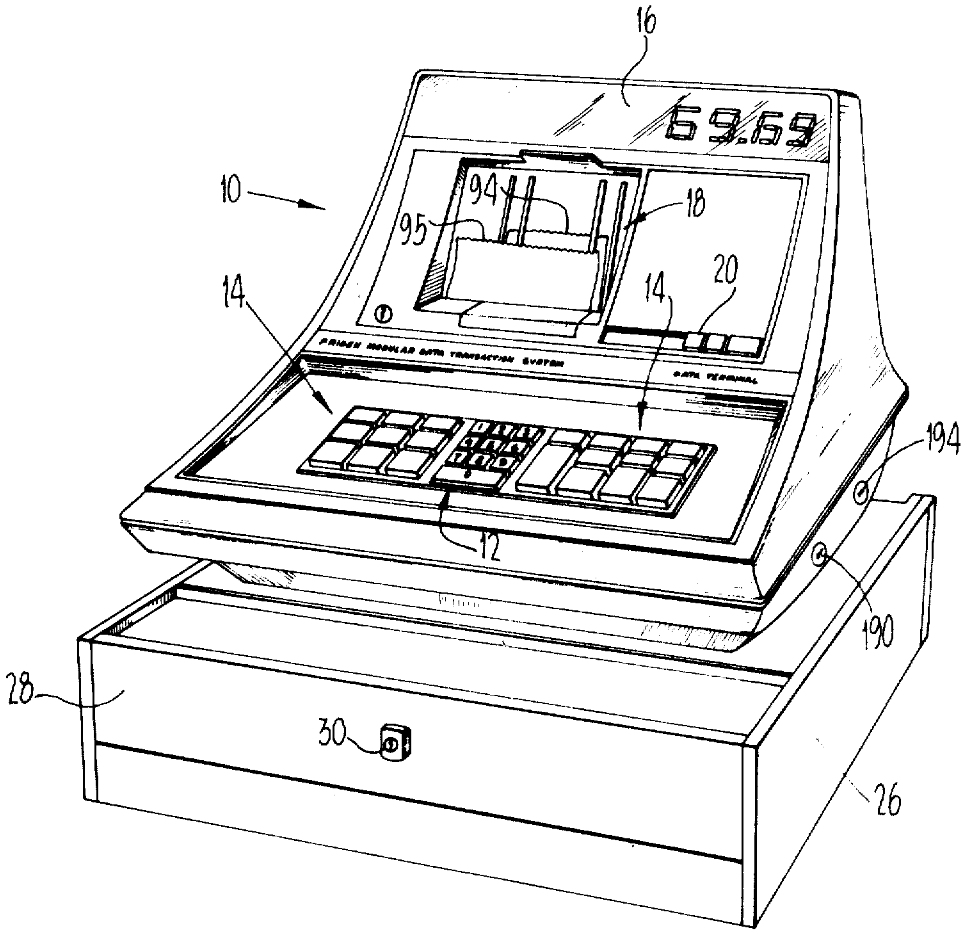
FIG. 1 is a perspective illustration of the operator's terminal of the present invention.

In FIG. 1 there is shown the basic data input or operator's terminal 10, utilized in the present invention. The input terminal is shown and described as a point of sale terminal, such as utilized in a retail sales store in a manner that is commonly known as a cash register. However, as will be evident from the ensuing description, the input terminal 10 may be utilized in other specific environments for particular purposes of accepting input data, such as, for example, in a manufacturing operation for accepting data indicative of certain completed steps in a manufacturing operation and the like.

The input terminal 10 includes a set of manually operable data or digit keys 12, a set of function keys 14 (described in more detail below), a visual display panel 16, a printing unit 18, a status-indicating panel 20, and various control switches.

The input terminal 10 is mounted on the top of a cash drawer and electronic unit 26 which includes a cash drawer 28 having a key-operated switch 30 and an operating solenoid, plus drawer position status-detecting switches (not shown in FIG. 1).

Within the lower portion of the cash drawer and electronic unit 26, there is mounted the functional electronic units (to be described in more complete detail below) associated with the input terminal 10.

The basic input terminal 10 in conjunction with its functional electronic units is capable of operating by itself as a data transaction system, and is capable of operating in conjunction with one or more peripheral data-handling devices with or without the cash drawer 28 as part of the data transaction system.

Figure 2:
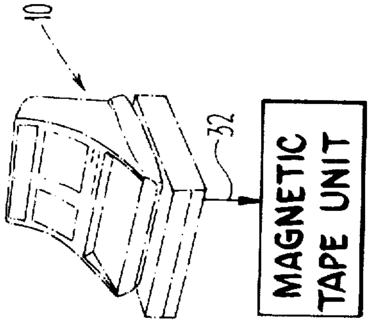
FIG. 2 is an illustration showing a data collection peripheral device connected with an operator's terminal of the present invention.

In FIG. 2 there is indicated a single data collection device or peripheral which may be, for example, a magnetic tape handler, a magnetic disc handler, a paper tape perforator unit, and the like. When the data collection device is coupled with a single input terminal 10 by means of a data and control cable 32, all data entered and operated on by the input terminal is transmitted to and recorded in the data collection device. The data collection device may then be physically disconnected from its associated input terminal 10 and transported to a central data processor or data-handling system for further processing of the collected data as desired.

Figure 3:
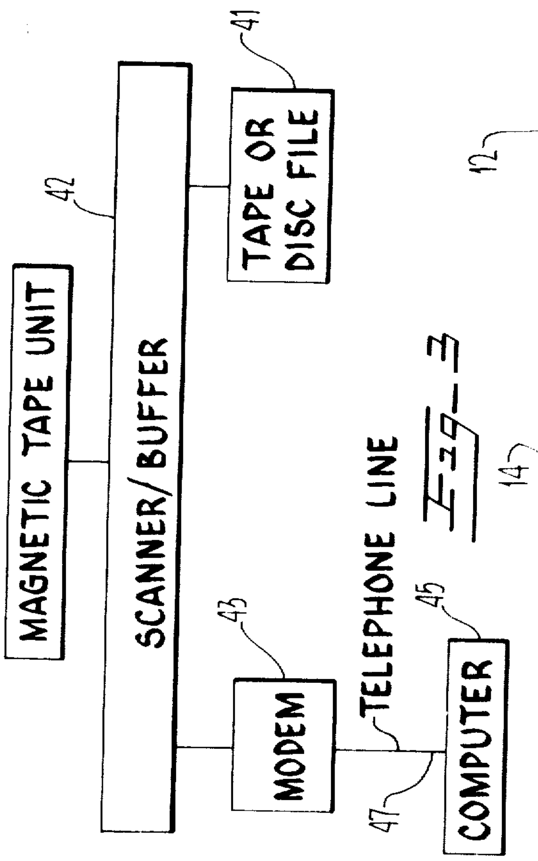
FIG. 3 is an illustration showing an off-line arrangement for transfer of data from a peripheral device to other data-handling devices.

In FIG. 3 there is shown a single data collection device indicated as a magnetic tape unit, physically removed from its input terminal of FIG. 2 and connected to a scanner/buffer unit 42 which serves the function of accepting data from one or more of the magnetic tape units and transmitting the data to another data-handling device, such as for example, tape or disc file 41, or modem 43 for transmission to a remote computer 45 via telephone line 47.

Figure 4:
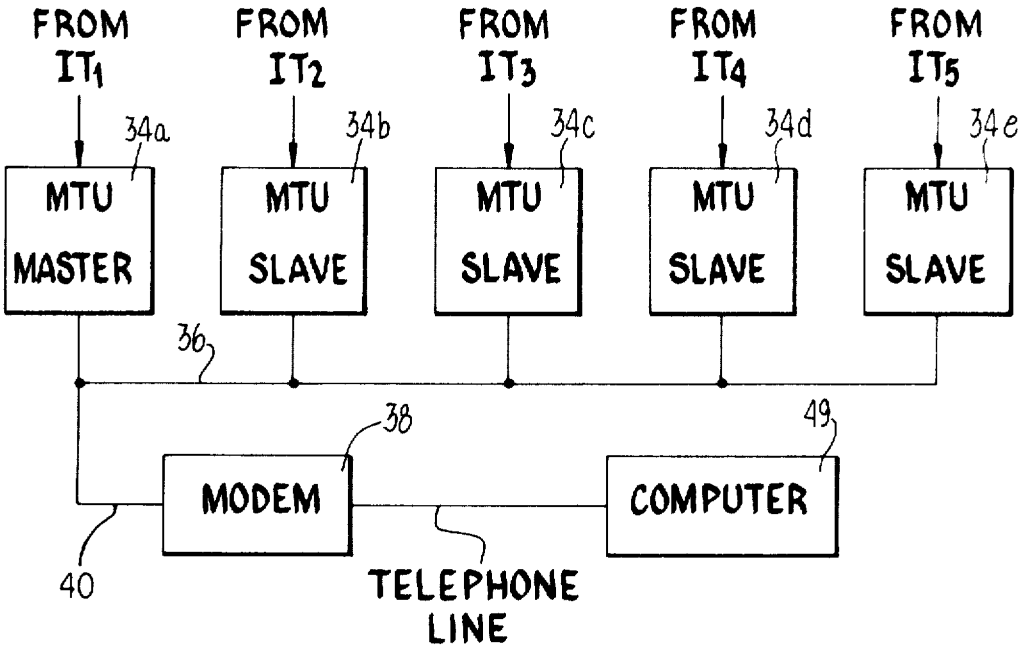
FIG. 4 is a simplified illustration showing a plurality of data collection devices connected between associated operator's terminals and a data-handling device.

In FIG. 4 there is shown five data collection peripherals 34*a*, 34*b*, 34*c*, 34*d*, and 34*e*, each of which may be of the type referred to above as data collection device of FIG. 2. Each data collection peripheral 34 is connected to an associated input terminal unit $IT_1$, $IT_2$, $IT_3$, $IT_4$, and $IT_5$, respectively, by way of associated data transmission and control cables (not numbered).

The data collection devices 34 are connected in parallel to each other by way of an interconnection signal and control channel 36. One of the data collection peripherals, 34*a*, is designated a master peripheral, and is coupled with a central data modem unit 38, by means of data and control channel 40. Upon command from the central data-handling or electronic data processor system 49, the data stored in each of the five data collection peripherals 34 is transmitted to the electronic data processor.

Figure 5:
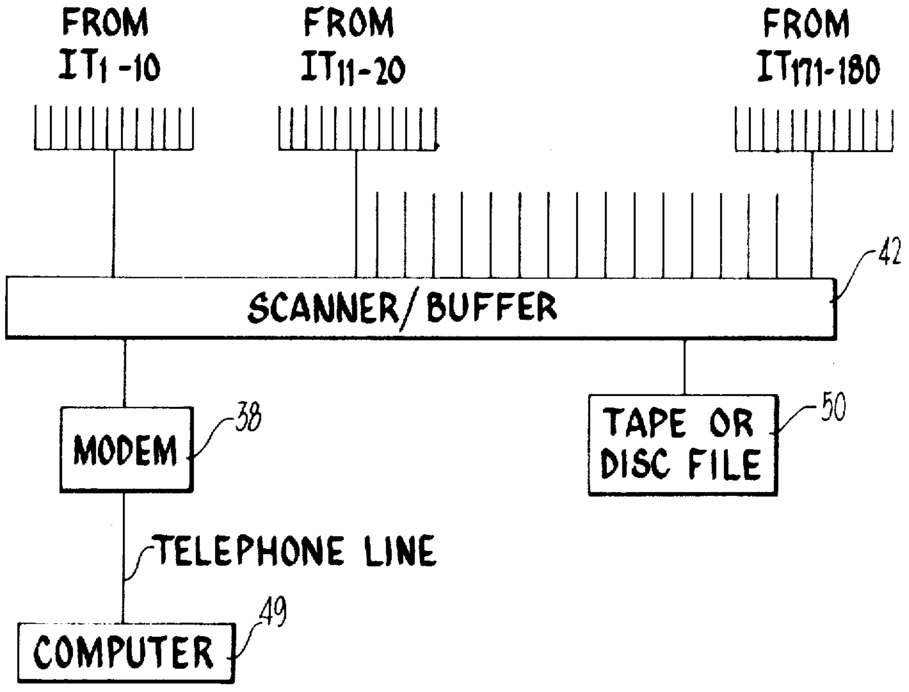
FIG. 5 is a simplified illustration showing how a large plurality of operator's terminals of the present invention may be coupled online with other data-handling devices.
Figure 2:
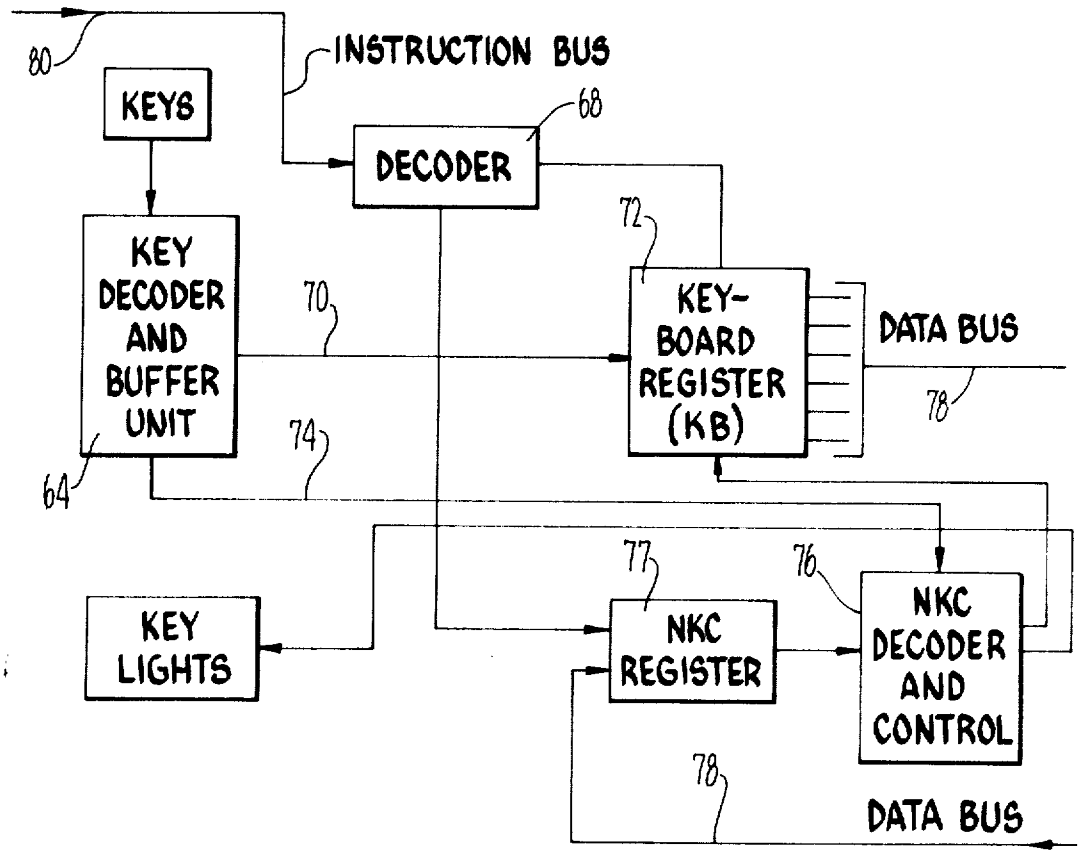

Another arrangement for using a plurality of data transaction systems of the present invention is shown in FIG. 5 wherein a plurality of up to 180 individual input terminals $IT_{1-180}$ may be connected directly to a scanner/buffer unit 42 which, in turn, controls transmission of data between the input terminals and desired peripheral devices, such as for example, a magnetic tape or disc file 50 and/or an electronic data processor 49 coupled to the scanner/buffer 42 by suitable means, such as a modem 38 and a telephone line as in the FIG. 4 arrangement. The FIG. 5 arrangement may be termed a real-time or online arrangement wherein data may be transferred between the input terminals IT and the scanner/buffer unit 42 for subsequent transmittal between the peripheral devices 50 and/or 49 during the times that the Input Terminals are being utilized in their normal mode of operation, i.e., as point of transaction devices or cash registers.

This is to be contrasted with the arrangements shown in FIG. 3 where data is transferred from a peripheral device (tape unit) to a file 41 or computer 45 only by being disconnected from its associated input terminal (FIG. 2).

The tape or disc file 50 (FIG. 5) is accessible from each of the input terminals $IT_1$–$IT_{128}$ and is useful for checking certain input information against fixed data in the file 41, such as for example, checking the credit status of an account number entered at the input terminals.

Figure 6:
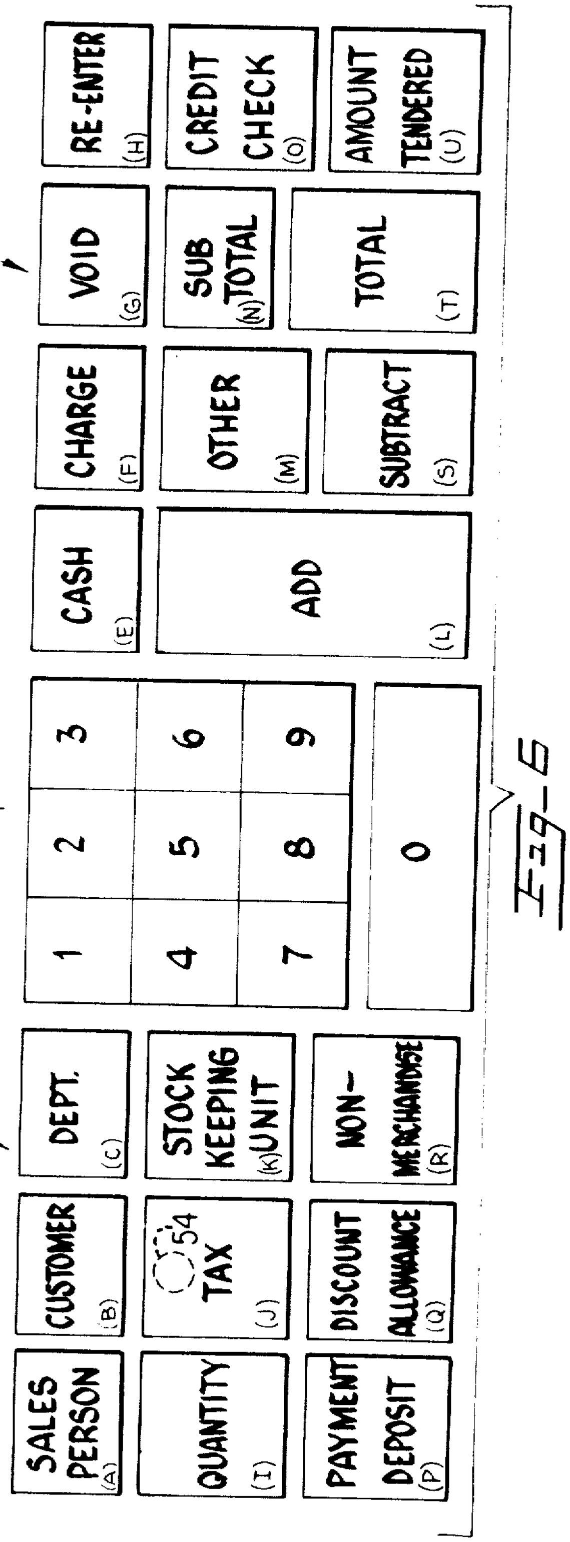
FIG. 6 is an enlarged view of the keyboard of the operator's terminal of FIG. 1.

In FIG. 6, there is shown in more complete detail the keyboard of the input terminal of FIG. 1. In the middle of the keyboard, there is a set of 10 normally operable digit keys 12 for entering numbers into the central processor section of the input terminal to be described in detail below.

On each side of the digit keys 12, there are disposed a series of manually operable function-initiating keys 14. The exact operations performed by actuation of each of these keys will be described in detail below. However, one important feature of the present invention is the inclusion of an illuminating lamp 54 (only one is shown in dotted lines in the tax key) within the body of each of the function keys 14 except three of the keys labeled in FIG. 6 as QUANTITY key, SUBTOTAL key, and AMOUNT TENDERED key. During normal operation of the input terminal, as for example, a sales person's entering the required data and computing the correct amounts for a retail sales transaction, various ones of the key lamps are illuminated to visually guide or instruct the operator to perform correctly the next required operation. Upon completion of each correct operation or step, a new set of key lamps will be illuminated and the previous ones will be extinguished as required and controlled by the logic of the apparatus.

In FIG. 7, there is shown a simplified block diagram of the logic units associated with the keys 12 and 14 of the keyboard unit.

A set of instruction signals or codes are transmitted in parallel over an instruction bus 80, which includes a plurality of parallel leads, from the processor (FIG. 16), to be described below, and are received in a keyboard unit decoding unit 68. The keyboard unit decoder recognizes two distinct keyboard codes, the first of which enables a keyboard register (KB) 72, and the second of which enables a next-keyboard-condition register 77.

Manual operation, i.e., depression, of any of the keys 12 and 14 of the keyboard causes generation of a unique set of key signals or code in any desired manner well known in the art, as for example, contact closures, and stores the key code in a keyboard decoding and buffer unit 64.

If a digit key 12 was operated, the key code in the buffer unit 64 will be transferred to the keyboard register 72. If, however, a function key 14 was operated, the key code in the buffer unit will be furnished to the input of the KB-register and a next-keyboard-condition decoder and control unit 76.

During operation of the system of the present invention, an instruction code will be furnished on instruction bus 80 to the instruction decoder 68 which will enable the next-keyboard-condition register 77 and then a next keyboard condition data code will be transmitted over data bus 78 from the processor and received into the thus enabled NKC-register 77. The next keyboard condition code stored in the NKC-register defines which one or more of the function keys 14 may be operated next. The next keyboard condition code is furnished to a next keyboard condition decoder and control unit 76 which responds to the code contained in the NKC-register and provides lamp illumination power to the key lamp or lamps associated with those function keys 14 defined or specified by the code contained in the NKC-register.

The function key code furnished to the NKC-decoder 76 from the buffer unit 64 is compared with the NKC-code furnished to the NKC-decoder 76 from the NKC-register 77 and the NKC-decoder transmits an enabling signal to the KB-register if the function key that was operated, i.e., defined by the NKC-code in the NKC-register as being one that may be operated; in such an event the key code from the buffer unit 64 is entered into the KB-register for use as required by other units of the system when enabled to do so.

However, if the function key code furnished to the NKC-decoder 76 from the buffer unit 64 is determined by the NKC-decoder as being associated with a function key that is not within the group of correct function keys defined by the NKC-code stored in the NKC-register 77, the NKC-decoder will not enable entry of the key code from the key buffer 64 to the KB-register. Thus, there will be no function key code entered into the KB-register if an incorrect function key is operated. The lack of entry of a function key code in the KB-register when an incorrect function key is operated has no real effect on the system; the system will simply wait until a correct function key is operated.

New data entered into the input terminal by manual operation of the digit keys 12 (FIGS. 1 and 6) is displayed visually on the visual display panel 16. Up to 13 decimal digits may be entered and displayed. When the entered data is representative of a whole number, such as, for example, a customer's account number, no decimal point is displayed on the visual display panel. On the other hand, when the data entered by operation of the digit keys is representative of a number having a decimal fraction portion, such as, for example, the price or money value of an article being purchased, a decimal point will be visually displayed between the second and third order digits from the right. Display or nondisplay of a decimal point is controlled by the internal logic units of the present invention. Control of decimal point display is primarily determined by the internal logic's determination that the next function to be performed is an arithmetic operation, and therefore the data or digits entered between the last operation of a function key 14 and the next operation of a function key 14 is to have a decimal point display on the visual display panel. There is no separate decimal point display or enter key on the keyboard.

In addition, results of arithmetic operation on data already entered in the present invention is displayed on the visual display panel.

Further, certain inquiry operations initiated as described in more detail below cause display of stored data or information codes on the display panel. Stored data may be, for example, accumulated sales totals, while stored information codes may be, for example, a customer's credit rating or limit.

Figure 8:
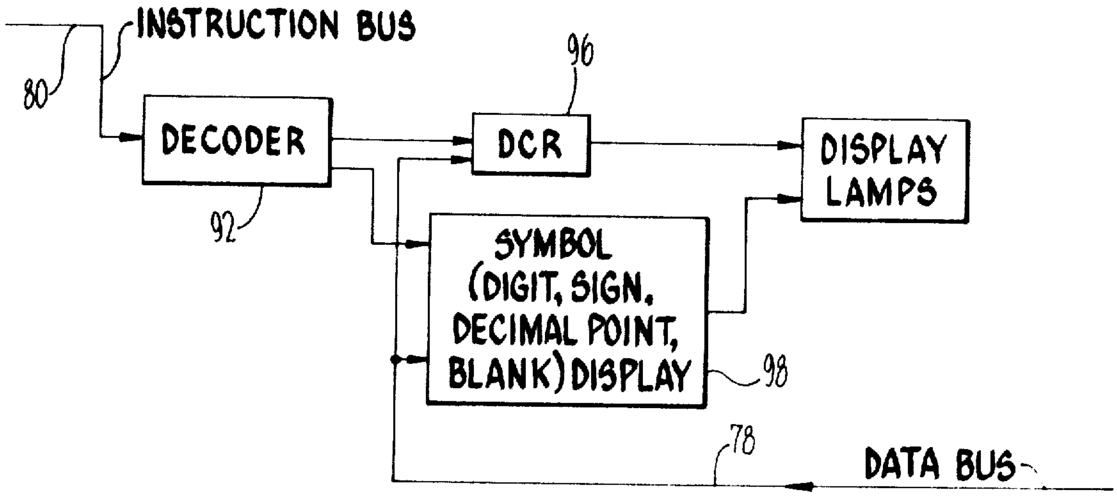
FIG. 8 is a simplified logic block diagram of the visual display unit of the present invention.

In FIG. 8, there is shown in simplified block diagram form the logic units associated with the visual display panel 16 of FIG. 1. The instruction bus 80 is coupled to a visual display unit decoder 92. A digit order instruction or code is transmitted over the instruction bus 80 from the processor (FIG. 16) and recognized or decoded by the decoder 92 which, in turn, transmits a display-enabling signal to a display column register (DCR) 96. The display column register 96 is thus placed in a condition to receive a decimal order or column defining set of data signals from the data bus 78 which comprises a plurality of parallel leads. A set of signals defining which decimal order of the visual display panel 16 (FIG. 1) is to display a numeral is then transmitted over the data bus 78 from the processor and received by the display column register 96. The display column register then conditions only those numeral-forming display lamps associated with the defined digit order in anticipation of a particular numeral-specifying set of data signals to be received on the data bus 78.

An instruction code is then transmitted over the instruction bus 80 from the processor and received by the visual display instruction decoder 92 which responds by transmitting a digit receive signal to a symbol register 98. The symbol register 98 is conditioned to respond to a numeral or symbol-defining set of signals to be received from the data bus 78.

A numeral or symbol-defining set of signals is then transmitted on the data bus 78 from the processor and received by the symbol register 98. The symbol register responds to the numeral-defining signals received therein and transmits a lamp-energizing signal to all the lamp-energizing circuits associated with the numeral or symbol to be displayed (as determined by the numeral-defining set of signals on data bus 78). Only that order (column) lamp-energizing circuit enabled by the previously received order defining set of signals now stored in the display column register is completely enabled. Thus, the correct or desired numeral or symbol illuminating lamps in the correct or desired decimal order is illuminated for visual observation.

Upon operation of certain ones of the function keys 14 (FIGS. 1 and 6), and sequence of events directed by the processor (FIG. 16) certain information is printed on a strip of paper 94 and, if desired, an inserted form 95 in the printing unit 18. The printing unit may be any type of printing apparatus desired that will accept character data signals sequentially for printing on preferably a horizontal printing area from right to left. In an embodiment of the present invention, actually built, the printing unit 18 is substantially like that shown and described in copending U.S. application, Ser. No. 724,880, filed Apr. 29, 1968, by L. D. Chamness for "Printing Means" and assigned to the same assignee as the present application. In addition, the printing unit includes a special logo printer which, upon command, prints a logo symbol on the paper.

Figure 9:
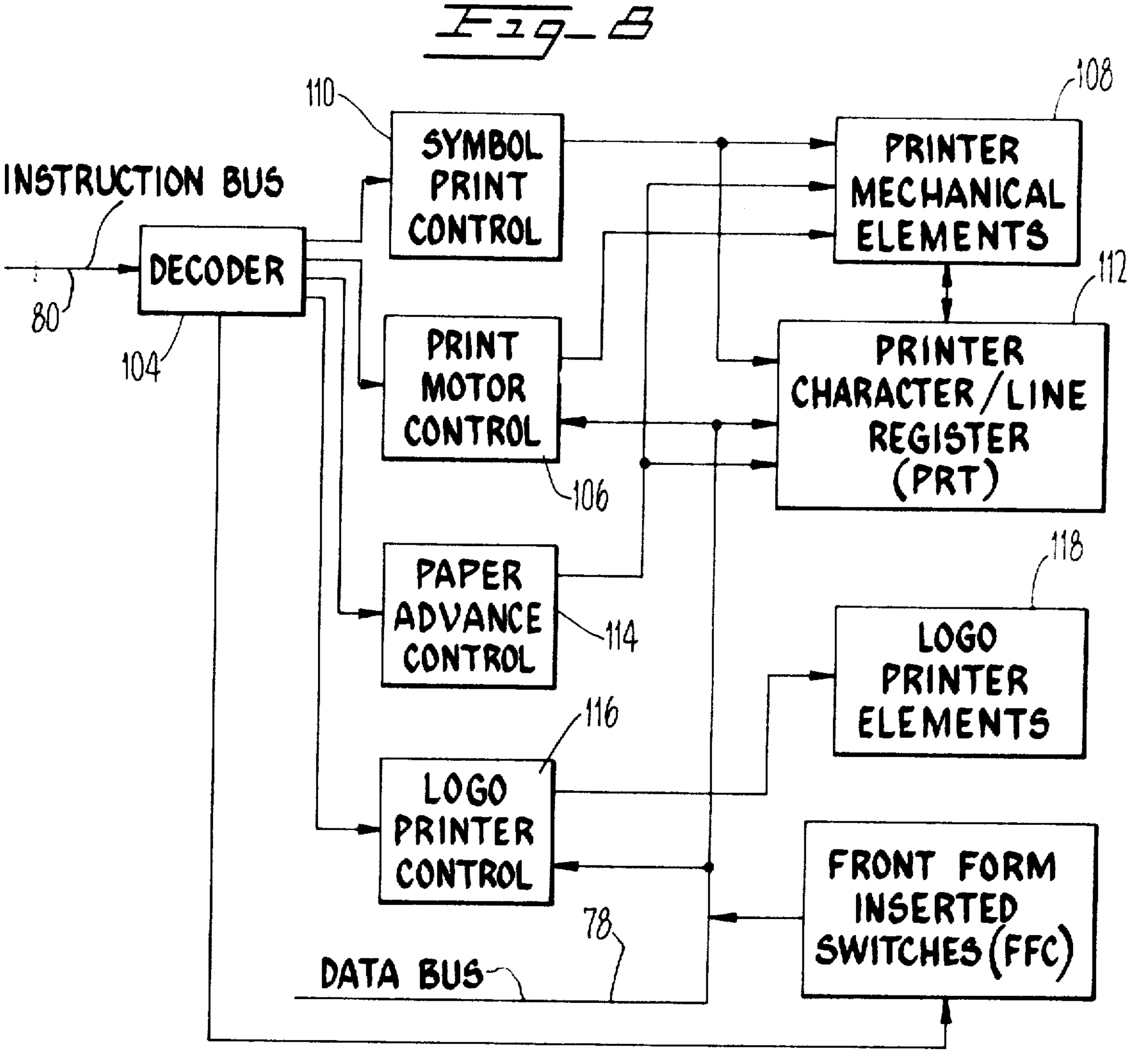
FIG. 9 is a simplified logic block diagram of the printing unit of the present invention.

Shown in FIG. 9 is the block diagram illustrating the basic logic units associated with the printer unit. Printer commands or instructions are transmitted over instruction bus 80 from the processor (FIG. 13) and received in a printer decoder unit 104.

The decoder 104 will recognize an instruction code to enable response by the printer's motor control unit 106. Upon receipt of a first particular data code from the processor (FIG. 16) via data bus 78 the printer motor (not shown but included as part of the printer mechanical elements unit 108) is turned on. The printer motor must be turned on for printing of numerals or symbols, and for advancing paper in the printer.

On the other hand, receipt of a second particular data code from the processor via data bus 78 following enabling of the motor control unit 106 by the motor control enabling instruction received in the decoder 104 via instruction bus 80 will cause the printer motor to be turned off.

In order to print a numeral or symbol after the printer motor is turned on, an instruction code is transmitted via the instruction bus 80 which is recognized by the decoder 104 as commanding a print operation; the decoder 104 transmits an enabling signal to a symbol print control unit 110 which in turn conditions the electrical operating devices of the mechanical elements 108 of the printer and also conditions the character/line register (PRT) 112 for receiving character data from the data bus 78. A character-representing set of signals or data is then transmitted on the data bus 78 from the processor (FIGS. 16A, B and C) and received in the character/line register (PRT). The correct character (numeral, symbol or space) is then printed by the printer.

After repeating the above sequence of operations to print the desired characters on one line of the paper, the paper is advanced one or more lines as will now be described.

An instruction code from the processor (FIG. 16), received in the printer decoder unit is recognized as requiring a paper advance operation and the decoder 104 thus transmits an enabling signal to the paper advance control unit 114 which in turn responds by transmitting an enabling signal to the character/line register (PRT) 112 and the printer mechanical elements unit 108. A set of data signals or code defining the number of lines of paper to be advanced is then transmitted on the data bus 78 from the processor (FIGS. 16A, B and C) and entered into the character/line register (PRT) 112. The printer then advances paper the required number of lines.

When it is desired to print a logo on the paper in the printer an instruction indicating the logo printer is to be utilized is transmitted on the instruction bus 80 from the processor (FIG. 16) and recognized by the decoder 104. The decoder responds and transmits an enabling signal to a logo printer control unit 116. Then a set of data signals defining the condition that the logo printer is to be activated (or deactivated) is transmitted on the data bus 78 from the processor and received in the enabled logo printer control unit 116. The logo printer control unit then transmits an appropriate logo-actuating signal to the logo printer elements 118.

In FIG. 10, there is illustrated in more complete detail the cash drawer control switch 30 also shown in FIG. 1. This switch is a key-operated three-position switch; each position of the switch determines certain functions that may be performed during operation of the input terminal, as will now be described. The switch can be turned or moved from one position to another only by insertion of a tumbler-type key.

The "normal" position of the switch 30 for normal operation of the input terminal is with the key slot 31 in the horizontal operate position pointed to the index mark OPERATE. With the cash drawer switch in the operate position, the cash drawer opening is initiated exclusively by an instruction code originating in the processor. The processor will also initiate opening of the cash drawer as part of the operations performed in response to manual actuation of the total key (FIG. 6) or void key.

When the key slot 31 of the cash drawer switch 30 is turned to the position pointing to the index mark RELEASE, the cash drawer will open automatically. This position of the switch can be used to open the drawer even when there is a power failure to the input terminal or a failure of the logic units in the input terminal to effect opening of the drawer.

The input terminal of the present invention is operable in three different modes of operation. The mode that the terminal is operated in is controlled by a manually operable four-position keylock mode control switch 190 shown in FIGS. 1 and 11, located at the side of the cabinet structure (FIG. 1) of the input terminal 10.

When the keyslot 292 of the mode control switch is pointed to OFF, as shown in FIG. 11, no electrical power is furnished to the input terminal and thus the terminal is in a completely nonoperative condition.

Pivoting the mode control switch clockwise from the OFF position to the OPEN/X position will place the terminal in a fixed factor entry and accumulated data printout (FE–AP) mode of operation. Such mode of operation is utilized to enter variable data into the terminal's read/write (R/W) memory for use during otherwise normal operation. Such variable data in a sales transaction use of the present invention would be, for example, an input terminal identification or station number, a tax factor or percentage, a discount factor or percentage, and date-indicating numerals. The data that may be printed out, without clearing of such data may be, for example, tax total, discount total, cash total, and sales total.

When the mode control switch 290 is turned so that its keyslot 292 points to the third position marked OPERATE, the terminal is conditioned to operate in a normal data entry mode. Such normal data entry mode is the operation of the digit and function keys to enter a sales or other type of transaction into the input terminal.

Placing the mode control switch 290 to its fourth position, where the keyslot 292 points to CLOSE, automatically causes the terminal to initiate and complete a printout and clear mode of operation. In the printout and clear mode of operation all accumulated data is printed and such accumulated data is cleared from the storage locations in the R/W memory of the processor.

A program switch 294, as shown in FIG. 12, is used in conjunction with the mode control switch 290 to provide for programming the operating requirements and characteristics of the various function switches. The program switch 294 is operative only if the mode control switch 290 (FIG. 11) is in its third or OPERATE position. With the mode switch in the OPERATE position, turning the program switch 294 so that its keyslot is pointed to the ON position will place the input terminal in programming mode of operation.

In FIG. 13, there is shown the logic control associated with the cash drawer and switch, as mentioned above. Briefly described, a set of instruction signals defining a command to open the cash drawer is transmitted over the instruction bus 80 from the processor and received by an instruction decoder unit 118. The decoder unit 118 responds by transmitting a drawer open command signal to a drawer opening solenoid control unit 124 which in turn furnishes electrical power to a solenoid 126 which is actuated to open the spring loaded cash drawer.

The cash drawer must be manually pushed to its closed position.

During operation of the system of the present invention the status of the three manually operated switches 30 (FIG. 10), 290 (FIG. 11), and 294 (FIG. 12) and the open or closed condition of the cash drawer is required to be known in order to determine and control subsequent action. Basically the determination is to determine what mode of operation the system is to operate in.

The manually operable switches mentioned above and a cash drawer position indicating switch are wired together as indicated in FIG. 13 by a drawer and manual switches unit (DWR) 128. Upon receipt of a unique instruction from the processor on the instruction bus 80 indicating that a code indicative of the position of the manual switches and cash drawer is required, the decoder, which recognizes such unique code transmits a signal to the drawer and manual switches unit (DWR) 128 which in turn transmits the unique switches and drawer-indicating code on the data bus 78 to the processor.

Figure 15:
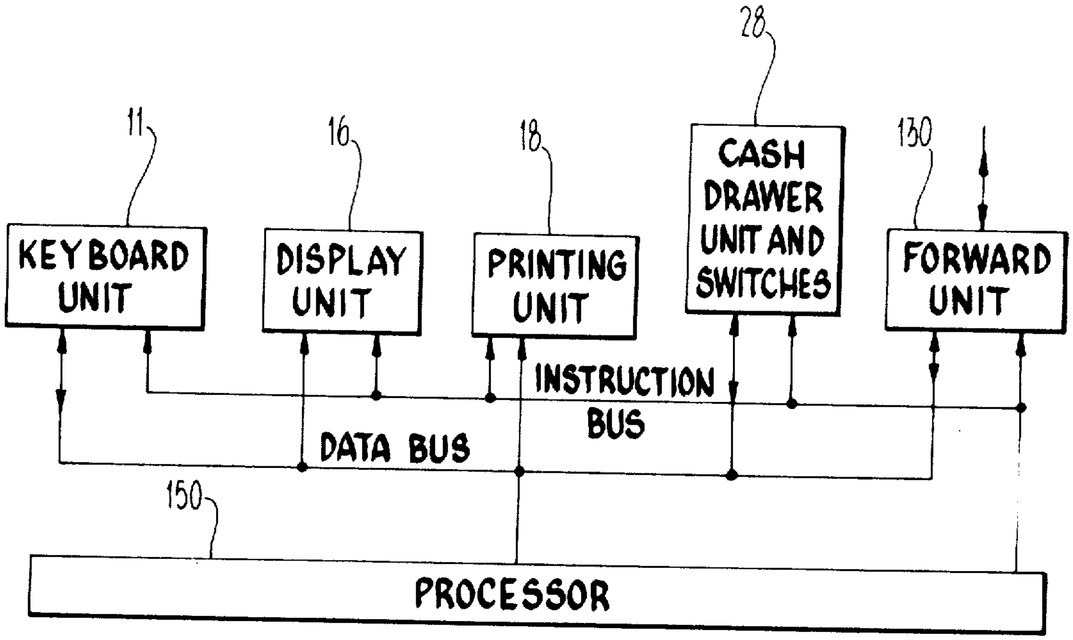
FIG. 15 is a block diagram of the operator's terminal of the present invention.

When an input terminal 10 (FIG. 1) is used with a peripheral device such as, for example, a tape unit (FIGS. 2 and 4), or scanner/buffer unit 42 (FIGS. 3 and 5), a data forwarding unit (FU) 130 shown in FIG. 15 is utilized to accept data signals in parallel on the data bus 78 from the processor and effect transfer of such data signals in serial over a communications channel to the attached peripheral device. Further, data signals may be received in serial from an attached peripheral device and transferred in parallel onto the data bus 78 by means of the forwarding unit 130.

Figure 14:
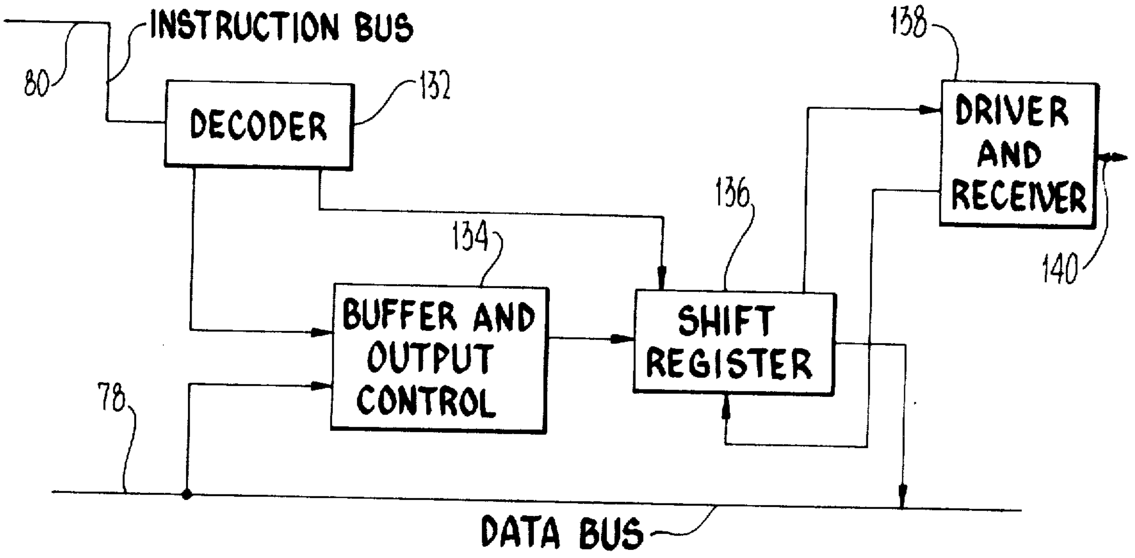
FIG. 14 is a simplified logic block diagram of the data forwarding unit of the present invention.

In FIG. 14 there is shown in simplified form the logic units of the forwarding unit. Instruction codes are transmitted from the processor on the instruction bus 80 and received in a decoder 132. The decoder 132 recognizes a code which is to effect transfer of data from the processor into the forwarding unit and sends an enabling signal to a buffer and output control unit 134. Data signals from the processor are then transmitted in parallel on the data bus 78 and received in parallel in the enabled buffer and control unit 134. The buffer and control unit then controls transfer of the received data signals in parallel into a shift register 136. The data signals in the shift register then are transmitted in serial to a driver and receiver unit 138 which transmits the signals in serial over a communications channel 140 to an attached peripheral device.

Data from an attached peripheral device may be transmitted over the communications channel 140 in serial to the driver and receiver unit 138 which in turn will transmit the data signals in serial into the shift register 136. Then an instruction code from the processor on the instruction bus 80 is received in the decoder 132 which recognizes the code as requesting a transfer of the data in the forward unit's shift register 136 to the processor. The decoder thus enables the shift register 136 to transfer its contents in parallel to the processor via the data bus 78.

The general logic organization of the input terminal is illustrated in FIG. 15. In this figure, the previously discussed keyboard unit 11, display unit 16, printing unit 18, cash drawer and switches unit 28, and forward unit 130 are shown interconnected by means of the instruction bus 80 and data bus 78 which are also connected with a processor unit 150. As is now apparent, only instruction data appears on the instruction bus 80 and all other data, including numeric data, appears on the data bus 78.

The processor unit includes a sequencer, a memory unit, an arithmetic unit and various other logic units, to be described in more detail below, for handling the transfer operations of various data items.

There will now be described the major logic organization of the processor of the present invention with reference to FIG. 16 (*a*, *b* and *c*).

In FIG. **16*a*, there is shown an instruction storage means or sequencer 154**. The sequencer contains 1,024 locations, each location having contained or stored therein an instruction in the form of a fixed or preset set of signals which are read from the sequencer when the location is addressed or selected.

The sequencer 154 may be any well-known means for accepting a large plurality of instructions in the form of coded signals, and for reading or accessing each instruction as desired without destroying the instruction. For example, the sequencer may be a preset, core memory, capacitive memory, and the like. In an embodiment of the present invention actually built, the sequencer 154 comprises a complex of interconnected microcircuits so arranged at the time of manufacture to define a set of 1,024 separate instructions, each instruction being individually selectable or addressable, and each addressed instruction being readable as a combination of electrical signals at certain ones of instruction decoders as discussed previously plus others to be discussed below.

In table I, there is set forth a list of the instructions contained in each address or instruction location of the sequencer. The instructions are set forth in the right-hand column of table I by a short English language statement of the effect that the combination of signals actually read out of the location will accomplish. In the left-hand column of table I in alignment with certain address locations is a term which identifies a main group or subgroup that begins at that location. The instructions are so arranged that one-half or instructions 0–511 are considered to be part of main group instructions, while the other half, or instructions 512–1023 are considered to be part of subgroup instructions.

The advantage in having main group instructions in one-half of the sequencer and subgroup instructions in the other half is the ease in going from a main group instruction to a subgroup and back to the main group with a very economical or minimum number of instructions in the sequencer 154.

TABLE I

| Routine/ Subroutine Name | Location | Instruction |
|---|---|---|
| Start | 0 | Go to 908 |
| | 1 | Go to 740 |
| | 2 | Set 0 into MAC |
| | 3 | Set 63 into MEM |
| | 4 | Go to 826 |
| | 5 | Go to 536 |
| | 6 | Set 8 into MEM |
| | 7 | Go to 26 |
| Mode (Determines what mode of operation is required) | 8 | Move DWR into D |
| | 9 | Set 48 into A |
| | 10 | If, go to 502 |
| | 11 | Set 15 into A |
| | 12 | If, go to 1008 |
| | 13 | Set 4 into printer (releases logo printer) |
| Enter A (keyboard entry) | 14 | Move DWR into A |
| | 15 | Set 1 into D |
| | 16 | If, go to 512 |
| | 17 | Go to 526 |
| | 18 | Move KB into A |
| | 19 | Move A into B |
| | 20 | Set 2 into printer (turns print motor off) |
| | 21 | If, go to 8 |
| | 22 | Set 63 into D |
| | 23 | If, go to 30 |
| Reenter (reenter sequence | 24 | Move KB to 0 (clears KB register) |
| | 25 | Set 15 into DCR (turns visual display off) |
| Clean ("house cleaning" sequence) | 26 | Go to 536 |
| | 27 | Move MDR into MEM |
| | 28 | Go to 740 |
| | 29 | Go to 8 |
| Dig. Test (entry of digits | 30 | Set 48 into D |
| | 31 | If, go to 932 |
| | 32 | Go to 738 |
| | 33 | Go to 542 |
| | 34 | Set 14 into MAC |
| | 35 | Move MEM into A |
| | 36 | Set 49 into D |
| | 37 | If, go to 8 |
| Lt. Reen (turn on reenter lamp sequence) | 38 | Set 32 into KB (turns on reenter lamp) |
| | 39 | Go to 8 |
| +— (check previous function as being tax or discount) | 40 | Go to 700 |
| | 41 | Go to 774 |
| | 42 | Go to 962 |
| | 43 | If, go to 312 |
| | 44 | Set 28 into MAR |
| | 45 | Set 0 into MAC |
| | 46 | Go to 748 |
| | 47 | Set 29 into MEM |
| | 48 | Set 29 into Z |
| | 49 | Go to 792 |
| +— A2 (Multiplier check) | 50 | Set 50 into MAC |
| | 51 | Set 27 into MAR |
| | 52 | Set 0 into B |
| | 53 | Move MEM into A |
| | 54 | Set 49 into D |
| | 55 | If, go to 60 |
| | 56 | Decrease A by 1 |
| | 57 | Move A into MEM |
| | 58 | Go to 972 |
| | 59 | Go to 50 |
| +— A1 (Shift multiplier and product left) | 60 | Decrease D by 1 |
| | 61 | If, go to 260 |
| | 62 | Set 11 into MAC |
| | 63 | Go to 738 |
| | 64 | Set 30 into MAR |
| | 65 | Set 48 into B |
| | 66 | Go to 738 |
| | 67 | Go to 50 |
| FUN-OP | 68 | Set 15 into DCR (turns visual display off) |
| (function accepted) | 69 | Go to 536 |
| | 70 | Move A into KB |
| | 71 | Move A into MEM |
| FUN-OP2 (Function sort No. 1) | 72 | Go to 526 |
| | 73 | Move MEM into MDR |
| | 74 | Move B into MEM |
| | 75 | Set 8 into MEM |
| | 76 | Move MEM into D |
| | 77 | Move B into MEM |
| | 78 | Set 9 into A |
| | 79 | If, go to 950 |
| | 80 | Set 4 into Z |
| | 81 | Go to 782 |
| | 82 | Set 15 into Z |
| | 83 | Go to 652 |
| NEED ID (introduce identification) | 84 | Set 12 into Z |
| | 85 | Set 28 into B |
| | 86 | Go to 792 |
| | 87 | Move MEM into MDR |
| | 88 | Set 13 into MAC |
| | 89 | Go to 748 |
| | 90 | Go to 526 |
| | 91 | Go to 774 |
| | 92 | Set 9 into D |
| | 93 | If, go to 118 |
| | 94 | Go to 746 |
| | 95 | Go to 700 |
| | 96 | Set 16 into MEM |
| | 97 | Go to 512 |
| | 98 | Move Z into D |
| | 99 | Set 31 into A |
| | 100 | Set 3 into printer (actuates logo printer) |
| | 101 | Set 0 into DRW (opens drawer) |
| | 102 | Set 1 into MEM |
| | 103 | If, go to 496 |
| | 104 | Move A/S into MEM |
| | 105 | NOP |
| | 106 | Set 5 into B |
| | 107 | Set 0 into MAR |
| TOTAL B (accumulate temp. totals) | 108 | Set 7 into Z |
| | 109 | Go to 598 |
| | 110 | Dec MAR by 1 |
| | 111 | Move B into A |
| | 112 | Set 8 into D |
| | 113 | If, go to 108 |
| +— C1 (Remove leading | 114 | Set 15 into Z |
| | 115 | Set 30 into MAR |
| | 116 | Go to 652 |

| | | |
|---|---|---|
| zeros) | 117 | Go to 826 |
| +— C (update last amount printed) | 118 | Set 31 into MAR |
| | 119 | Go to 750 |
| | 120 | Go to 780 |
| | 121 | Move MEM into MDR |
| | 122 | Set 30 into MAR |
| | 123 | Go to 736 |
| POSPB1 (shift number for printing) | 124 | Set 0 into MAC |
| | 125 | Set 13 into Z |
| POSPB2 (move number to print buffer | 126 | Go to 582 |
| | 127 | Set 29 into MAR |
| | 128 | Go to 518 |
| | 129 | Go to 780 |
| TOTAL D (Prepare to develop print message) | 130 | Go to 740 |
| | 131 | Go to 784 |
| PR MESS B (print character "0" test) | 132 | Set 0 into A |
| | 133 | Move D into MEM |
| | 134 | If, go to 754 |
| | 135 | Move MAR into D |
| | 136 | Set 28 into A |
| | 137 | If, go to 172 |
| | 138 | Go to 786 |
| | 139 | Go to 132 |
| PR MESS F (transfer word to entry buffer and test for shift) | 140 | Go to 792 |
| | 141 | Go to 784 |
| | 142 | Set 32 into D |
| | 143 | If, go to 148 |
| | 144 | BAMD into MEM |
| | 145 | Set 11 into Z |
| | 146 | Go to 778 |
| | 147 | Go to 784 |
| PR MESS C (shift test) | 148 | Set 16 into D |
| | 149 | If, go to 154 |
| | 150 | BAMD into MEM |
| | 151 | Set 1 into Z |
| | 152 | Go to 778 |
| | 153 | Go to 784 |
| PR MESS D (Clear Test for first two characters) | 154 | Set 8 into D |
| | 155 | If, go to 742 |
| | 156 | BAMD into MEM |
| | 157 | Set 30 into MAR |
| | 158 | Set 13 into MAR |
| | 159 | Go to 748 |
| PR MESS D2 (Clear and shift for entry of data | 160 | Set 30 into MAR |
| | 161 | Set 11 into D |
| | 162 | Go to 752 |
| | 163 | Go to 784 |
| | 164 | Set 0 into B |
| | 165 | Set 1 into D |
| | 166 | Set 10 into Z |
| | 167 | If, go to 778 |
| | 168 | Set 29 into B |
| | 169 | Go to 780 |
| | 170 | Set 1 into printer (turns printer motor on) |
| | 171 | Go to 130 |
| PR MESS E (check for date and test mode) | 172 | Set 28 into MAR |
| | 173 | Go to 680 |
| | 174 | Move C/B into D (fifth bit) |
| | 175 | Set 0 into A |
| | 176 | If, go to 204 |
| | 177 | Move MDR into MEM |
| | 178 | Move DRW into D |
| | 179 | Set 31 into A |
| | 180 | If, go to 326 |
| | 181 | Set 40 into D |
| | 182 | Move MDR into A |
| | 813 | If, go to 26 |
| PRCLRTOT (Prepare to clear temporary totals) | 184 | Set 0 into MAR |
| | 185 | Set 11 into PRT (advances paper 11 lines) |
| CLRTOT (clear totals) | 186 | Go to 750 |
| | 187 | Inc. MAR by 1 |
| | 188 | Inc. MAR by 1 |
| | 189 | Move MAR into A |
| | 190 | Set 9 into D |
| | 191 | If, go to 186 |
| WAIT (transmit and increment ticket number) | 192 | Go to 864 |
| | 193 | Go to 740 |
| | 194 | Set 1 in A/S and C/B (sets A/S and C/B) |
| | 195 | Set 10 into MAC |
| | 196 | Set 12 into MAR |
| | 197 | Go to 976 |
| | 198 | Go to 700 |
| | 199 | Set 32 into MEM |
| WAIT A (Mode test and loop) | 200 | Set 31 into A |
| | 201 | Move DWR into D |
| | 202 | If, go to 200 |
| | 203 | Go to 26 |
| PRINT B (Pick up date for printing) | 204 | Set 27 into Z |
| | 205 | Set 40 into MEM |
| | 206 | Set 28 into B |
| | 207 | Go to 792 |
| | 208 | Move MEM into MDR |
| | 209 | Set 8 into MAC |
| | 210 | Go to 748 |
| | 211 | Go to 130 |
| PEDT (transfer selected function information to transmission area) | 212 | Go to 826 |
| | 213 | Go to 526 |
| | 214 | Set 40 into D |
| | 215 | If, go to 218 |
| | 216 | Set 47 into D |
| | 217 | If, go to 430 |
| OVER (move information to print buffer) | 218 | Go to 790 |
| | 219 | Go to 526 |
| | 220 | Set 39 into D |
| | 221 | Set 8 into Z |
| | 222 | If, go to 230 |
| | 223 | Set 40 into D |
| | 224 | If, go to 26 |
| | 225 | Set 27 into MAR |
| | 226 | Set 16 into MEM |
| | 227 | Go to 784 |
| | 228 | Set 7 into MEM |
| | 229 | Go to 26 |
| TOD (mark tax temporary totals) | 230 | Set 32 into A |
| | 231 | Move MDR into D |
| | 232 | Go to 700 |
| | 233 | If, go to 236 |
| | 234 | Set 2 into A |
| | 235 | Set 11 into Z |
| TODA (mark discount temporary totals) | 236 | Move A/S and C/B into MEM |
| | 237 | BAPD into MEM |
| | 238 | Go to 964 |
| | 239 | If, go to 246 |
| | 240 | Set O into A |
| | 241 | Set 12 into MAC |
| | 242 | Set 30 into B |
| | 243 | Go to 794 |
| | 244 | Set 10 into Z |
| | 245 | Go to 778 |
| TODB (move second tax or discount message to print buffer) | 246 | Set 29 into B |
| | 247 | Go to 780 |
| | 248 | Go to 736 |
| | 249 | Set 4 into Z |
| TDOQ (move multiplier into location) | 250 | Go to 778 |
| | 251 | Go to 746 |
| | 252 | Set 12 into MAC |
| | 253 | Set 30 into B |
| | 254 | Go to 976 |
| | 255 | Go to 700 |
| | 256 | Go to 774 |
| | 257 | Set 6 into D |
| | 258 | If, go to 130 |
| | 259 | Go to 26 |

| | | |
|---|---|---|
| +- E | 260 | Set 31 into MAR |
| | 261 | Go to 518 |
| | 262 | Set 5 into MAC |
| | 263 | Set 5 into MEM |
| | 264 | Go to 700 |
| | 265 | Go to 774 |
| | 266 | Set 5 into D |
| | 267 | If, go to 1012 |
| | 268 | Go to 970 |
| | 269 | Set 4 into D |
| | 270 | Go to 520 |
| | 271 | Set 4 into Z |
| +- A5<br>(reposition<br>product) | 272 | Set 30 into MAR |
| | 273 | Go to 582 |
| +- A7<br>(accumulate<br>Trans total<br>and temp<br>total) | 274 | Set 4 into B |
| | 275 | Go to 596 |
| | 276 | Go to 700 |
| | 277 | Go to 774 |
| | 278 | Set 1 into D |
| | 279 | If, go to 282 |
| | 280 | Move A into B |
| | 281 | Go to 596 |
| +- A3<br>(check for<br>cash total) | 282 | Go to 700 |
| | 283 | Move A/S and C/B into A |
| | 284 | Move C/B into D (5th bit) |
| | 285 | BAMD into MEM |
| | 286 | Set 16 into D |
| | 287 | If, go to 114 |
| | 288 | Set 7 into Z |
| | 289 | Set 33 into D |
| | 290 | Set O into B |
| | 291 | Set 30 into MAR |
| | 292 | If, go to 770 |
| | 293 | Go to 114 |
| +- F | 294 | Move C/B into D |
| | 295 | Set O into A |
| | 296 | If, go to 274 |
| | 297 | Set 31 into MAR |
| | 298 | Go to 518 |
| | 299 | Go to 780 |
| | 300 | Go to 784 |
| | 301 | Set 32 into A/S and C/B (sets A/S, resets C/B |
| | 302 | Set 3 into MEM |
| | 303 | Set 30 into B |
| | 304 | Set 15 into Z |
| | 305 | Go to 626 |
| | 306 | Go to 652 |
| | 307 | Go to 736 |
| | 308 | Set 27 into MAR |
| | 309 | Set 12 into MAC |
| | 310 | Go to 966 |
| | 311 | If, go to 314 |
| +- A8 | 312 | Go to 746 |
| | 313 | Go to 274 |
| +- A9 | 314 | Set 30 into MAR |
| | 315 | Set O into MAC |
| | 36 | Go to 748 |
| | 317 | Go to 50 |
| XREADC | 318 | Go to 922 |
| | 319 | Set 33 into MEM |
| | 320 | Set 2 into MAC |
| | 321 | Move MEM into MDR |
| XREADCI<br>(total in<br>X reading) | 322 | Set 9 into B |
| | 323 | Go to 532 |
| | 324 | Move D into MEM |
| | 326 | Go to 926XREADA |
| (test for<br>totals in<br>Xread and<br>close) | 327 | Move Z into MAC |
| | 328 | Move MAC into D |
| | 328 | If, go to 978 |
| | 330 | Go to 782 |
| | 331 | Set 9 into MEM |
| | 332 | Go to 744 |
| | 333 | Set 11 into MAR |
| | 334 | Set O into MAC |
| | 335 | Inc. Z by 1 |
| | 336 | Inc. Z by 1 |
| | 337 | Move Z into MEM |
| | 338 | Go to 114 |
| | 339 | NOP |

| | | |
|---|---|---|
| MGMTDISC<br>(enter %<br>discount) | 340 | Set 4 into Z |
| | 341 | Go to 778 |
| | 342 | Set 11 into B |
| | 343 | Set 11 into MAC |
| MGMTEND | 344 | Go to 816 |
| | 345 | Go to 130 |
| MGMTTAX<br>(enter %<br>tax) | 346 | Set 4 into Z |
| | 347 | Go to 778 |
| | 348 | Set 8 into B |
| | 349 | Go to 344 |
| MGMT | 350 | Move MEM into MDR |
| | 351 | Move B into MEM |
| | 352 | Go to 790 |
| | 353 | Go to 526 |
| | 354 | Go to 938 |
| | 355 | Go to 130 |
| MGMTID<br>(enter<br>register ID) | 356 | Set 12 into B |
| | 357 | Set 9 into D |
| | 358 | Set 0 into MAC |
| | 359 | Go to 344 |
| PRGRMI<br>(Initialize<br>program<br>development) | 360 | Move MEM into MDR |
| | 361 | Move B into MEM |
| | 362 | Go to 790 |
| | 363 | Set 30 into MAR |
| | 364 | Move MEM into B |
| | 365 | Set O into Z |
| PROGRA<br>(Program<br>Development) | 366 | Move Z into D |
| | 367 | Move MEM into A |
| | 368 | BAPD into Z |
| | 369 | Move MAC into A |
| | 370 | Inc. MAC by 1 |
| | 371 | Set 8 into D |
| | 372 | If, go to 366 |
| | 373 | Move MEM into A |
| | 374 | Set 9 into MAR |
| | 375 | Move B into MAC |
| | 376 | Move MEM into B |
| | 377 | Move A into MEM |
| | 378 | Increase MAR by 1 |
| | 379 | Move MEM into MDR |
| | 380 | Move Z into MEM |
| | 381 | Go to 130 |
| CACH<br>(cash and<br>charge keys) | 382 | Set 11 into D |
| | 383 | If, go to 386 |
| | 384 | Go to 700 |
| | 385 | NOP |
| CHCA<br>(cash flag) | 386 | Go to 826 |
| | 387 | Go to 124 |
| NPEDF<br>(function key<br>sort No. 2) | 388 | Move B into A |
| | 389 | Set 12 into D |
| | 390 | If, go to 382 |
| | 391 | Set 14 into D |
| | 392 | If, go to 40 |
| | 393 | Go to 826 |
| | 394 | Go to 700 |
| | 395 | Move A/S into A (sixth bit) |
| | 396 | Move C/B into D (fifth bit) |
| | 397 | BAMD into MEM |
| | 398 | Go to 784 |
| | 399 | Set 1 into D |
| | 400 | If, go to 420 |
| | 401 | Move MDR into MEM |
| | 402 | Go to 746 |
| | 403 | Set 11 into Z |
| | 404 | Go to 778 |
| | 405 | Set 29 into MAR |
| | 406 | Go to 518 |
| | 407 | Go to 780 |
| | 408 | Move MEM into D |
| | 409 | Set 40 into A |
| | 410 | If, go to 428 |
| | 411 | Move MDR into MEM |
| | 412 | Set 36 into A |
| | 413 | Set 8 into Z |
| | 414 | If, go to 250 |
| | 415 | NOP |
| MDDEMI<br>(Dept.,<br>mdse., and<br>misc. | 416 | Move MDR into MEM |
| | 417 | Set 27 into MAR |
| | 418 | Set 2 into MEM |
| | 419 | Go to 130 |

| Routine | Step | Instruction |
|---|---|---|
| manipulation) | | |
| EARLY (move entries to print buffer) | 420 | Go to 790 |
| | 421 | Go to 526 |
| | 422 | Set 37 into D |
| | 423 | If, go to 416 |
| QTY (quantity routine) | 424 | Set 38 into D |
| | 425 | Set 4 into Z |
| | 426 | If, go to 250 |
| | 427 | Go to 784 |
| MEM3 (memo with add-subtract) | 428 | Set 5 into MEM |
| | 429 | Go to 130 |
| MEM2 (memo with cash-charge) | 430 | Move MEM into MDR |
| | 431 | Set 5 into MEM |
| | 432 | Go to 700 |
| | 433 | Set 11 into Z |
| | 434 | Set 30 into MAR |
| | 435 | Go to 126 |
| ACCT | 436 | Go to 790 |
| | 437 | Go to 826 |
| ACCT1 (account transmission | 438 | Set 16 into Z |
| | 439 | NOP |
| | 440 | Set 10 into KB (turns on transmit lamp) |
| starting | 441 | Set 18 into FU (transmission start code) |
| point) | | |
| ACCT2 (repeat point in account transmission | 442 | Move Z into MAC |
| | 443 | Dec. Z by 1 |
| | 444 | Move MEM into A |
| | 445 | Move A into MEM |
| | 446 | Set 1 into D |
| | 447 | If, go to 450 |
| | 448 | Move A into FU |
| | 449 | NOP |
| OMIT (avoid leading zeros) | 450 | Move Z into D |
| | 451 | Set O into A |
| | 452 | If, go to 442 |
| | 453 | Set 23 into FU (end of transmission code) |
| | 454 | Move FU into A (error or lack of error in transmission code) |
| | 455 | Set 22 into D |
| | 456 | If, go to 438 |
| | 457 | Set 24 into D |
| | 458 | Set 11 into KB (turn off transmit lamp) |
| | 459 | If, go to 130 |
| | 460 | Move FU into D (credit rating code) |
| | 461 | Set 62 into A |
| | 462 | If, go to 130 |
| | 463 | Move D into Z |
| | 464 | Go to 536 |
| | 465 | Set 16 into MEM |
| | 466 | Go to 740 |
| | 467 | Set 0 into MAC |
| | 468 | Set 26 into MEM |
| | 469 | Move Z into B |
| | 470 | Go to 738 |
| | 471 | Go to 566 |
| | 472 | Go to 826 |
| | 473 | Set 29 into B |
| | 474 | Go to 780 |
| | 475 | Go to 26 |
| AMTTEN (change computation | 476 | Go to 512 |
| | 477 | Set 33 into D |
| | 478 | If, go to 38 |
| | 479 | Move A into MEM |
| | 480 | Go to 972 |
| | 481 | Go to 652 |
| | 482 | Move C/B into A (fifth bit) |
| | 483 | If, go to 38 |
| | 484 | Set 15 into DCR (turn off visual display) |
| | 485 | Go to 38 |
| MOD 10 S | 486 | Set 32 into A/S and C/B (sets A/S, resets C/B) |
| (modulo ten double add) | 487 | Move D into A |

| Routine | Step | Instruction |
|---|---|---|
| | 488 | BCDALG into B (A is added to D according to A/S and the first four bits of the result are set into B in BCD code) |
| | 489 | Move B into D |
| MOD 10 SS | 490 | Move Z into A |
| | 491 | Move MDR into MEM |
| | 492 | BCDALG into Z (A is added to D according to A/S and the first 4 bits of the result are set into Z) |
| | 493 | Inc. MAC by 1 |
| | 494 | Set 14 into D |
| | 495 | Return-Indexed |
| VOID 2 (void print message, correction) | 496 | Go to 784 |
| | 497 | Set 33 into MEM |
| | 498 | Set 29 into MAR |
| | 499 | Set 33 into MEM |
| | 500 | Go to 826 |
| | 501 | Go to 130 |
| CLOSE (initiate close sequence) | 502 | Go to 922 |
| | 503 | Set 1 into MEM |
| | 504 | Go to 322 |
| | 505 | NOP |
| XVOID (void key in management X reading) | 506 | Go to 536 |
| | 507 | Move MDR into A |
| | 508 | Move MDR into MEM |
| | 509 | Set 14 into D |
| | 510 | If, go to 14 |
| | 511 | Go to 0 |
| DWR/DISP (sequence to blank display after closing cash drawer) | 512 | Set 9 into MAC |
| | 513 | Set 11 into MAR |
| | 514 | Move MEM into A |
| | 515 | If, return-indexed |
| | 516 | Set 15 into DCR (turns visual display off) |
| | 517 | Set 31 into MAR |
| CLEAR COM (initialize full clear routine) | 518 | Set 15 into MAC |
| | 519 | Set 15 into D |
| CLEAR (clear sequence) | 520 | Inc. MAC by 1 |
| | 521 | Move MEM into MDR |
| | 522 | Move MAC into A |
| | 523 | If, go to 520 |
| | 524 | Move MAR into B |
| | 525 | Return-Indexed |
| INIT EB (Examine Column 00 in entry buffer) | 526 | Set 30 into MAR |
| | 527 | Set 0 into MAC |
| | 528 | Move MEM into A |
| | 529 | Move MDR into MEM |
| | 530 | Move MDR into Z |
| | 531 | Return-Indexed |
| TOTNKC (pick total NKC in X readings) | 532 | Set 9 into MAC |
| | 533 | Set 9 into MAR |
| | 534 | Move MEM into D |
| | 535 | Move D into MEM |
| INIT NKC (initialize location of stored NKC | 536 | Set 11 into MAR |
| | 537 | Set 10 into MAC |
| | 538 | Move MEM into A |
| | 539 | Inc. MAC by 1 |
| | 540 | Move MEM into KB |
| | 541 | Return-Indexed |
| VERIFY (initialize for modulo 11 verification) | 541 | Set 0 into MAC |
| | 543 | Move MEM into Z |
| VERIFY 2 (module 11 verification sequence) | 544 | Inc. MAC by 1 |
| | 545 | Move MEM into A |
| | 546 | Set 48 into D |
| | 547 | Move A into M |
| | 548 | If, go to 558 |
| | 549 | BAMD into B |
| | 550 | Move B into A |
| | 551 | Move Z into D |
| | 552 | BAPD into Z |

| | | |
|---|---|---|
| | 553 | Move Z into A |
| | 554 | Set 11 into D |
| | 555 | If, go to 544 |
| | 556 | BAMD into Z |
| | 557 | Go to 544 |
| VERIFY 1 (eliminate leading keyboard zeros) | 558 | Dec. MAC by 1 |
| | 559 | Move MEM into A |
| | 560 | Set 49 into D |
| | 561 | If, return-indexed |
| | 562 | Move A into MEM |
| | 563 | Set 0 into MAC |
| | 564 | Move Z into MEM |
| | 565 | Set 0 into A/S (resets A/S and resets C/B |
| NEG CR (clear display before new display) | 566 | Set 15 into DCR (turns display off) |
| | 567 | Set 0 into MAC |
| DISPLAY (display sequence) | 568 | Move MAC into DCR (selects decimal order) |
| | 569 | Inc. MAC by 1 |
| | 570 | Move MEM into A |
| | 571 | Set 16 into D |
| | 572 | If, go to 578 |
| | 573 | Move MDR into MEM |
| | 574 | Move MDR into DSPLY (number to selected display digit order) |
| | 575 | Set 13 into D |
| | 576 | Move MAC into A |
| | 577 | If, go to 568 |
| DISPLAY 1 (display sign) | 578 | Move C/B into A (fifth bit) |
| | 579 | If, return-indexed |
| | 580 | Set 60 into DSPLY (a − sign) |
| | 581 | Return-Indexed |
| SHFTLEF (initial shift left) | 582 | Set 0 into B |
| | 583 | Set 0 into MAC |
| SHFTLEFT (shift left sequence) | 584 | Inc. MAC by 1 |
| | 585 | Set 15 into D |
| | 586 | Move MEM into MDR |
| | 587 | Move B into MEM |
| | 588 | Move MDR into B |
| | 589 | Move MAC into A |
| | 590 | If, go to 584 |
| | 591 | Inc. Z by 1 |
| | 592 | Move Z into A |
| | 593 | Inc. MAC by 1 |
| | 594 | If, go to 582 |
| | 595 | Return-Indexed |
| DET ALG7 (full initialization for add or subtract) | 596 | Set 30 into MAR |
| | 597 | Set 7 into Z |
| DET ALG (partial initialization for add or subtract) | 598 | Set 0 into MAC |
| | 599 | Set 32 into D |
| DETBALG (determine what algebraic operation is required | 600 | Move MEM into A |
| | 601 | Move MDR into MEM |
| | 602 | BAPD into A/S (and C/B) |
| | 603 | Move A/S (and C/B into A) |
| | 604 | Move MAR into D |
| | 605 | Move B into MAR |
| | 606 | Move D into B |
| | 607 | Move MEM into D |
| | 608 | Move D into MEM |
| | 609 | BAPD into A/S (and C/B) |
| | 610 | Move C/B into D (fifth bit) |
| | 611 | Set 0 into A |
| | 612 | If, go to 614 |
| | 613 | Set 32 into D |
| DETAALG (set A/S as required) | 614 | Move BAPD into A/S |
| | 615 | Set 1 into MAC |
| ALGADD (algebraic operation) | 616 | Move MAR into A |
| | 617 | Move B into MAR |
| | 618 | Move A into B |
| | 619 | Move MEM into D |
| | 620 | Move D into MEM |
| | 621 | Move MAR into A |
| | 622 | Move B into MAR |
| | 623 | Move A into B |
| ALGADDA (special start for ALGADD) | 624 | Move MEM into A |
| | 625 | BCDALG into MEM (A+D algebraically MEM, carry is lost) |
| ALGADDB (special start for ALGADD) | 626 | Move 1 into D |
| | 627 | Move MAC into A |
| | 628 | Inc. MAC by 1 |
| | 629 | If, go to 616 |
| | 630 | Inc. B by 1 |
| | 631 | Move A/S (and C/B) into D |
| | 632 | Set 0 into A |
| | 633 | If, return-indexed |
| | 634 | Set 0 into MAC |
| | 635 | Move MEM into A |
| | 636 | Move A (sixth bit) into A/S (and fifth bit into C/B) |
| | 637 | Move C/B into D (fifth bit) |
| | 638 | BAMD into MEM |
| | 639 | Set 16 into A |
| | 640 | BAPD into A/S (and C/B) |
| | 641 | Move C/B into MEM (fifth bit) |
| | 642 | Set 16 into A/S (resets A/S, sets C/B) |
| | 643 | NOP |
| COMP (start complement) | 644 | Inc. MAC by 1 |
| | 645 | Set 0 into A |
| | 646 | Move MEM into D |
| | 647 | BCDALG (A+D) into MEM |
| | 648 | Move MAC into A |
| | 649 | Move Z into D |
| | 650 | If, go to 644 |
| | 651 | Return-indexed |
| REMLDZ (remove leading zeros) | 652 | Move A into MAC |
| | 653 | Set 15 into DCR (turns display off) |
| REMLDZZ (leading zeros removal) | 654 | Move MEM into D |
| | 655 | Set 1 into DCR |
| | 656 | Set 48 into A |
| | 657 | Set 48 into MEM |
| | 658 | Move D into MEM |
| | 659 | If, go to 668 |
| | 660 | Set 3 into D |
| | 661 | Move MAC into A |
| | 662 | If, go to 664 |
| | 663 | Move MEM into MDR |
| REMLDZY (insure significant 2 places right of decimal) | 664 | Dec. MAC by 1 |
| | 665 | Move MAC into D |
| | 666 | Set 0 into A |
| | 667 | If, go to 654 |
| D & P (determine sign to be displayed) | 668 | Set 59 into DSPLY (decimal point in display) |
| | 669 | Set 0 into A |
| | 670 | Move MAC into D |
| | 671 | Set 0 into MAC |
| | 672 | Move MEM into A/S and C/B |
| | 673 | Move MDR into MEM |
| | 674 | If, go to 568 |
| | 675 | Move C/B into D (fifth bit) |
| | 676 | Move MEM into A |
| | 677 | BAMD into MEM |
| | 678 | Set 32 into A/S (sets A/S, resets C/B) |
| | 679 | Go to 568 |
| PRINTZ (initialize print and set special character) | 680 | Set 15 into MAC |
| | 681 | Move MEM into A |
| | 682 | Set 0 into MAC |
| | 683 | Move A into MEM |
| | 684 | Set 30 into MAR |
| | 685 | Set 15 into MAC |
| | 686 | Move FFC into D (front form inserted or not code into D) |
| | 687 | Set 32 into A |
| | 688 | If, go to 690 |
| | 689 | Set 27 into MEM |

| | | |
|---|---|---|
| PRINT A (print Sequence) | 690 | Move MEM into PRT |
| | 691 | Set 15 into D |
| | 692 | Move MAC into A |
| | 693 | Inc. MAC by 1 |
| | 694 | If, go to 690 |
| | 695 | Dec. MAR by 1 |
| | 696 | Move MAR into D |
| | 697 | Set 27 into A |
| | 698 | If, go to 690 |
| | 699 | Set 1 into PRT (advances paper by 1 line) |
| IA FLAG (inspect accumulate/ cash flag) | 700 | Set 27 into MAR |
| | 701 | Set 0 into MAC |
| | 702 | Move MEM into A/S and C/B |
| | 703 | Return-Indexed |
| FENTEST (function entry test) | 704 | Set 9 into MAR |
| | 705 | Move B into MAC |
| | 706 | Move MEM into D |
| | 707 | Move D into MEM |
| | 708 | Inc. MAR by 1 |
| | 709 | Move MEM into Z |
| | 710 | Move Z into MEM |
| | 711 | Set 10 into MAC |
| | 712 | Set 11 into MAR |
| | 713 | Move D into MEM |
| | 714 | Set 30 into MAR |
| | 715 | Move Z into MAC |
| | 716 | Move MEM into D |
| | 717 | Set 0 into A |
| | 718 | If, go to 38 |
| | 719 | Set 16 into D |
| | 720 | Move Z into A |
| | 721 | If, go to 68 |
| | 722 | Set 1 into MAC |
| | 723 | Move MEM into A |
| | 724 | Move A into MEM |
| | 725 | If, go to 38 |
| | 726 | Move Z into A |
| | 727 | Set 32 into D |
| | 728 | If, go to 68 |
| | 729 | Set 48 into D |
| | 730 | If, go to 990 |
| | 731 | Set 0 into A |
| V TEST (verification test) | 732 | Set 0 into MAC |
| | 733 | Move MEM into D |
| | 734 | If, go to 38 |
| | 735 | Go to 68 |
| DECINSRT (initialize decimal insertion) | 736 | Set 27 into B |
| | 737 | Set 2 into MAC |
| DECINSR (selective initialization for shift left) | 738 | Set 14 into Z |
| | 739 | Go to 584 |
| CLEAR EB (initialize condition for clearing entry buffer) | 740 | Set 30 into MAR |
| | 741 | Go to 518 |
| A to MEM (minor branch in developing print messages) | 742 | Move A to MEM |
| | 743 | Go to 160 |
| IPCLRH (initialize partial clear of high order columns) | 744 | Set 7 into MAC |
| | 745 | Go to 748 |
| X MULT (initialize to clear multiplier) | 746 | Set 27 into MAR |
| | 747 | Set 11 into MAC |
| IPCLRHA (clear multiplier and high order columns) | 748 | Set 15 into D |
| | 749 | Go to 520 |
| IPCLRL (clear of low order columns) | 750 | Set 7 into D |
| | 751 | Set 32 into A/S (& C/B) (sets A/S, resets C/B) |
| IPCLRLA (clear of low order columns) | 752 | Set 15 into MAC |
| | 753 | Go to 520 |
| SEL ROW (select message containing row) | 754 | Set 56 into MEM |
| | 755 | Move D into B |
| | 756 | Move MEM into A |
| | 757 | Set 56 into D |
| | 758 | BAMD into Z |
| | 759 | Move Z into D |
| | 760 | Move B into A |
| | 761 | BAMD into B |
| | 762 | Move MAR into D |
| | 763 | Set 28 into MAR |
| | 764 | Move B into MEM |
| | 765 | Set 28 into A |
| | 766 | If, go to 768 |
| | 767 | Set 1 into MEM |
| PRROW (select row to be printed) | 768 | Set 30 into B |
| | 769 | Go to 140 |
| CASH TEST (test for temp. cash total) | 770 | Set 0 into A |
| | 771 | Move C/B into D (fifth bit) |
| | 772 | If, go to 600 |
| | 773 | Go to 598 |
| MNACCFLG (clear two most significant bits from character) | 774 | Move MDR into MEM |
| | 775 | Move MDR into MAC |
| | 776 | Move MAC into A |
| | 777 | Return-Indexed |
| SHIFTEB (initialize for shift left of entry buffer) | 778 | Set 30 into MAR |
| | 779 | Go to 582 |
| XFUREB (initialize transfer from entry buffer to another row) | 780 | Set 30 into Z |
| | 781 | Go to 792 |
| XFUR2EB (initialize transfer to entry buffer from another row) | 782 | Set 30 into B |
| | 783 | Go to 792 |
| RPCHAR (read character defining print message) | 784 | Set 27 into MAR |
| | 785 | Set 0 into MAC |
| RPCHARA (read character defining print message) | 786 | Inc. MAR by 1 |
| | 787 | Move MEM into A |
| | 788 | Move A into D |
| | 789 | Return-Indexed |
| EBTOPB2 (transfer of entry buffer contents to print buffer No. 2) | 790 | Set 30 into Z |
| | 791 | Set 28 into B |
| XFUR | 792 | Set 0 into A |

| | | |
|---|---|---|
| (initialize transfer) | 793 | Set 0 into MAC |
| XFURZ (transfer sequence) | 794 | Move Z into MAR |
| | 795 | Move MEM into MDR |
| | 796 | Move MDR into MEM |
| | 797 | Move B into MAR |
| | 798 | Move MDR into MEM |
| | 799 | Inc. MAC by 1 |
| | 800 | Move MAC into D |
| | 801 | If, go to 794 |
| | 802 | Set 32 into A/S (sets A/S, resets C/B) |
| | 803 | Return-Indexed |
| FIX DATE A (spaces in date printout) | 804 | Set 28 into MAR |
| | 805 | NOP |
| FIX DATE (spaces in date) | 806 | Inc. A by 1 |
| | 807 | Set 3 into MAC |
| | 808 | Move MEM into MDR |
| | 809 | Set 6 into MAC |
| | 810 | Move MEM into MDR |
| | 811 | If, go to 804 |
| | 812 | Set 30 into MAR |
| | 813 | Set 17 into B |
| | 814 | Set 8 into D |
| | 815 | Set 0 into MAC |
| DEXFER (transfers management entered information into proper locations) | 816 | Inc. MAC by 1 |
| | 817 | Move MEM into Z |
| | 818 | Move MDR into MEM |
| | 819 | Move MAR into A |
| | 820 | Move B into MAR |
| | 821 | Move MEM into MDR |
| | 822 | Move Z into MEM |
| | 823 | Move A into MAR |
| | 824 | Move MAC into A |
| | 825 | If, go to 816 |
| TRANSFER (initialize for transfer of entry buffer to transmission area) | 826 | Set 17 into Z |
| | 827 | Set 1 into Printer (starts Printer Motor) |
| XFERA (pick up information from entry buffer) | 828 | Set 30 into MAR |
| | 829 | Set 0 into A |
| | 830 | Dec. Z by 1 |
| | 831 | Move Z into MAC |
| | 832 | Move Z into D |
| | 833 | If, go to 836 |
| | 834 | Return-Indexed |
| | 835 | NOP |
| XFERB (test for blanks and branch to insert valid characters in transmission area) | 836 | Move MEM into D |
| | 837 | Move D into MEM |
| | 838 | If, go to 840 |
| | 839 | Go to 828 |
| XFERD (insert valid characters into transmission area) | 840 | Set 27 into MAR |
| | 841 | Set 11 into MAC |
| | 842 | Move MEM into B |
| | 843 | Dec. MAC by 1 |
| | 844 | Move MEM into A |
| | 845 | Move B into MAR |
| | 846 | Move A into MAC |
| | 847 | Move MEM into MDR |
| | 848 | Move D into MEM |
| | 849 | Dec. MAC by 1 |
| | 850 | Move MAC into A |
| | 851 | Set 15 into D |
| | 852 | If, go to 854 |
| | 853 | Inc. MAR by 1 |
| XFERE (test for transmission area filled; store location of next available transmission area location) | 854 | Move MAR into D |
| | 855 | Set 27 into MAR |
| | 856 | Set 11 into MAC |
| | 857 | Move D into MEM |
| | 858 | Dec. MAC by 1 |
| | 859 | Move A into MEM |
| | 860 | Set 25 into A |
| | 861 | If, go to 866 |
| | 862 | Go to 828 |
| | 863 | NOP |
| TRANSMIT (initialize conditions for transmit in sequence) | 864 | Set 1 into Z |
| | 865 | Set 1 into Printer (turns print motor on) |
| XMITA (store flag on transmit; pick up location of first empty location) | 866 | Set 27 into MAR |
| | 867 | Set 11 into MAC |
| | 868 | Move MEM into MDR |
| | 869 | Move Z into MEM |
| | 870 | Move MDR into Z |
| | 871 | Dec. MAC by 1 |
| | 872 | Set 10 into KB (turns transmit lamp on) |
| | 873 | Move MEM into B |
| XMITD (initialize access to transmission area and send "STX" and transaction I.D. code to forwarding unit) | 874 | Set 12 into MAR |
| | 875 | Set 14 into MAC |
| | 876 | Set 18 into FU ("start" transmission) |
| | 877 | Set 16 into FU (a transaction transmission code) |
| XMITD1 (step to next location in transmission area) | 878 | Dec. MAC by 1 |
| | 879 | Move MAC into D |
| | 880 | Set 14 into A |
| | 881 | If, go to 884 |
| | 882 | Dec. MAR by 1 |
| | 883 | NOP |
| XMITC (test for last transmission location) | 884 | Inc. MAR by 1 |
| | 885 | Move MAR into A |
| | 886 | Move Z into D |
| | 887 | If, go to 1020 |
| | 888 | Move MAC into D |
| | 889 | Move B into A |
| | 890 | If, go to 1020 |
| | 891 | Move DWR into D |
| | 892 | Set 48 into A |
| | 893 | If, go to 896 |
| | 894 | Set 23 into FU (end of transmission "normal") |
| | 895 | Go to 898 |
| XMITH (send ETX, end transmission, code to forwarding unit) | 896 | Set 19 into FU (end of "closing" transmission) |
| | 897 | NOP |
| XMITI (retransmit if necessary) | 898 | Move FU into D (code designating a good or no-good transmission to FU) |
| | 899 | If, go to 908 |
| | 900 | Set 22 into A |
| | 901 | If, go to 904 |
| | 902 | Go to 874 |
| | 903 | NOP |
| XMITG (develop X printout if transmission was bad) | 904 | Set 14 into printer (PRT) (prints X) |
| | 905 | Dec. A by 1 |
| | 906 | If, go to 904 |
| | 907 | Set 2 into PRT (paper advances 2 lines) |
| XMITF1 | 908 | Set 11 into KB (turns transmit lamp off) |
| | 909 | Set 27 into MAR |
| | 910 | Set 11 into MAC |
| | 911 | Move MEM into Z |
| | 912 | Set 12 into MEM |
| | 913 | Set 10 into MAC |
| | 914 | Move MEM into MDR |
| | 915 | Go to 828 |
| XY1 | 916 | Set 11 into MAR |

| | | |
|---|---|---|
| | 917 | Set 2 into MAC |
| | 918 | MEM into D |
| | 919 | D into MEM |
| | 920 | Set 7 into A |
| | 921 | If, go to 8 |
| XY | 922 | Set 11 into MAR |
| | 923 | Set 0 into MAC |
| | 924 | Move MEM into Z |
| | 925 | Return-Indexed |
| KEYSB (sort account, amount tendered and void) | 926 | Set 41 into D |
| | 927 | Set 16 into A/S (resets A/S., sets C/B) |
| | 928 | If, go to 436 |
| | 929 | Move B into A |
| | 930 | If, go to 476 |
| | 931 | Go to 84 |
| PROGRAM (test made to sort after function key depression) | 932 | Move DWR into D |
| | 933 | Set 31 into A |
| | 934 | If, go to 350 |
| | 935 | Set 15 into A |
| | 936 | If, go to 360 |
| | 937 | Go to 704 |
| MGMTA | 938 | Set 13 into KB (turn on "opening" mode function key lamps) |
| (key sort in management mode) | 939 | Set 7 into D |
| | 940 | If, go to 340 |
| | 941 | Set 10 into D |
| | 942 | If, go to 318 |
| | 943 | Set 12 into D |
| | 944 | If, go to 806 |
| | 945 | Set 39 into D |
| | 946 | If, go to 346 |
| | 947 | Set 40 into D |
| | 948 | If, go to 356 |
| | 949 | Go to 1014 |
| KEYSA (key sort in operate mode) | 950 | Set 40 into MEM |
| | 951 | Move MEM into A |
| | 952 | Move B into MEM |
| | 953 | Set 42 into D |
| | 954 | If, go to 926 |
| | 955 | Set 46 into D |
| | 956 | If, go to 388 |
| | 957 | Set 50 into D |
| | 958 | If, go to 212 |
| | 959 | Set 61 into D |
| | 960 | If, go to 40 |
| | 961 | Go to 130 |
| PRREGDIG | 962 | Set 3 into D |
| | 963 | If, go to 294 |
| REG DIG | 964 | Set 30 into MAR |
| | 965 | Set 1 into MAC |
| REGDIGA | 966 | Set 47 into A |
| | 967 | Move MEM into D |
| | 968 | Move MDR into MEM |
| | 969 | Return-Indexed |
| SET ADDD (set initial conditions for single add in multiply) | 970 | Set 32 into A/S (sets A/S, resets C/B) |
| | 971 | NOP |
| SET ADD | 972 | Set 1 into MAC |
| | 973 | Set 31 into B |
| | 974 | Set 30 into MAR |
| | 975 | NOP |
| SET ADD1 (set last column to be added) | 976 | Set 15 into Z |
| | 977 | Go to 616 |
| ENDX | 978 | Set 15 into DCR (turn display lamps off) |
| | 979 | Set 30 into A |
| | 980 | Move Z into D |
| | 981 | If, go to 184 |
| ENDXA | 982 | Set 9 into A |
| | 983 | If, go to 200 |
| | 984 | Inc. Z by 1 |
| | 985 | Inc. Z by 1 |
| | 986 | Set 0 into MAC |
| | 987 | Move Z into MEM |
| | 988 | Set 1 into MAR |
| | 989 | Go to 186 |
| MODIO (initialize conditions for modulo 10 comparison) | 990 | Set 0 into Z |
| | 991 | Set 0 into MAC |
| | 992 | Move MEM into MDR |
| | 993 | Move B into MEM |
| | 994 | Inc. MAC by 1 |
| | 995 | NOP |
| MODIOA (modulo 10 comparison | 996 | Set 32 into A/S (sets A/S, resets C/B) |
| | 997 | Move MEM into D |
| | 998 | Go to 490 |
| | 999 | Move MEM into D |
| | 1000 | Go to 486 |
| | 1001 | Move MAC into A |
| | 1002 | If, go to 996 |
| | 1003 | Set 0 into MAC |
| | 1004 | Move MEM into B |
| | 1005 | Move Z into MEM |
| | 1006 | Set 48 into A |
| | 1007 | Go to 732 |
| KEINAR | 1008 | Set 31 into A |
| | 1009 | If, go to 506 |
| | 1010 | Set 48 into KB (turns on void lamp) |
| | 1011 | Return-Indexed |
| +– S (shift 1 digit position right) | 1012 | Set 0 into Z |
| | 1013 | Go to 272 |
| MGMTVOID | 1014 | Set 11 into MAR |
| | 1015 | Set 2 into MAC |
| | 1016 | Set 8 into MEM |
| | 1017 | Set 11 into MAC |
| | 1018 | Set 13 into MEM |
| | 1019 | Go to 84 |
| XMITE | 1012 | Move MEM into MDR |
| | 1021 | Move MDR into MEM |
| | 1022 | Move MDR into FU |
| | 1023 | Go to 878 |

Figure 16A:
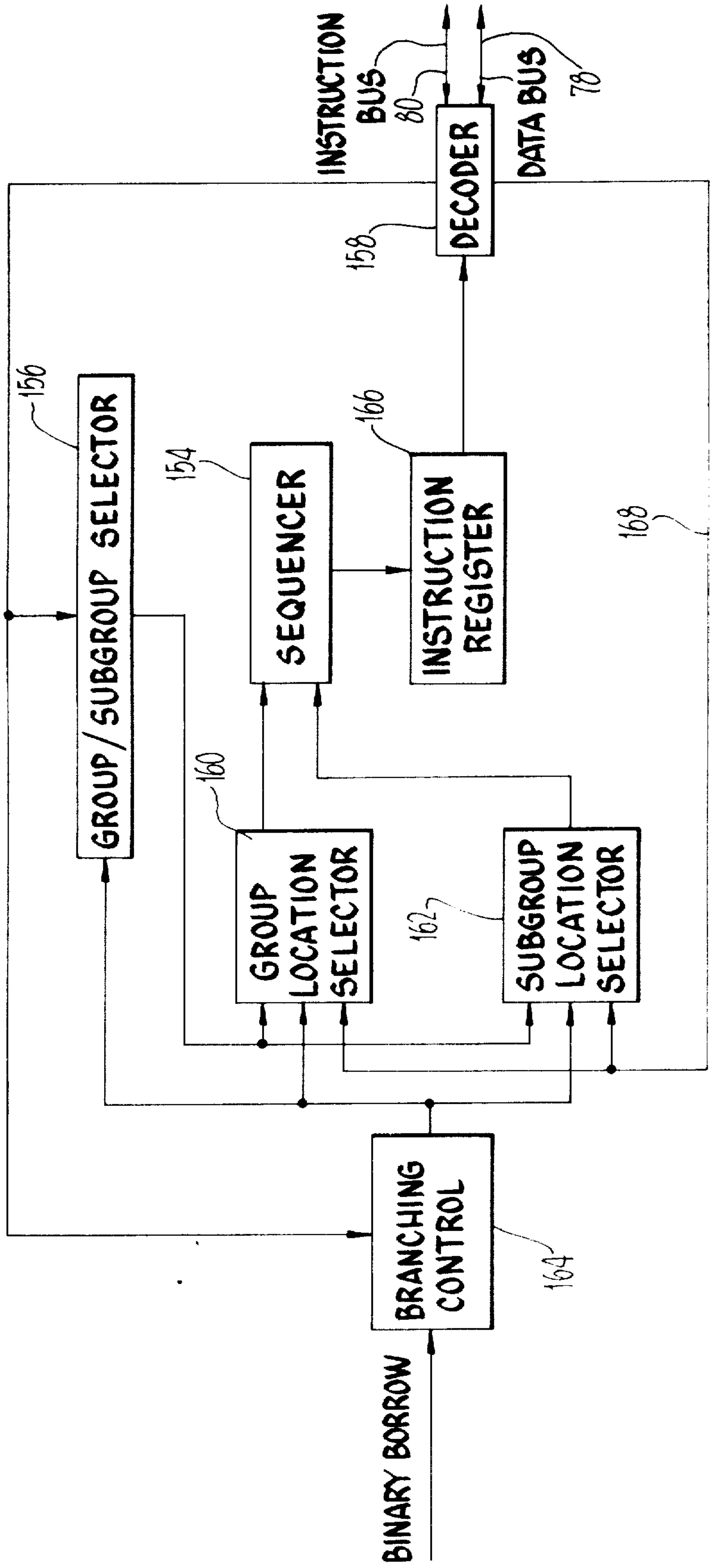
FIG. 16 (*a*, *b*, and *c*) is a logic block diagram of the processor of the present invention.
Figure 16B:
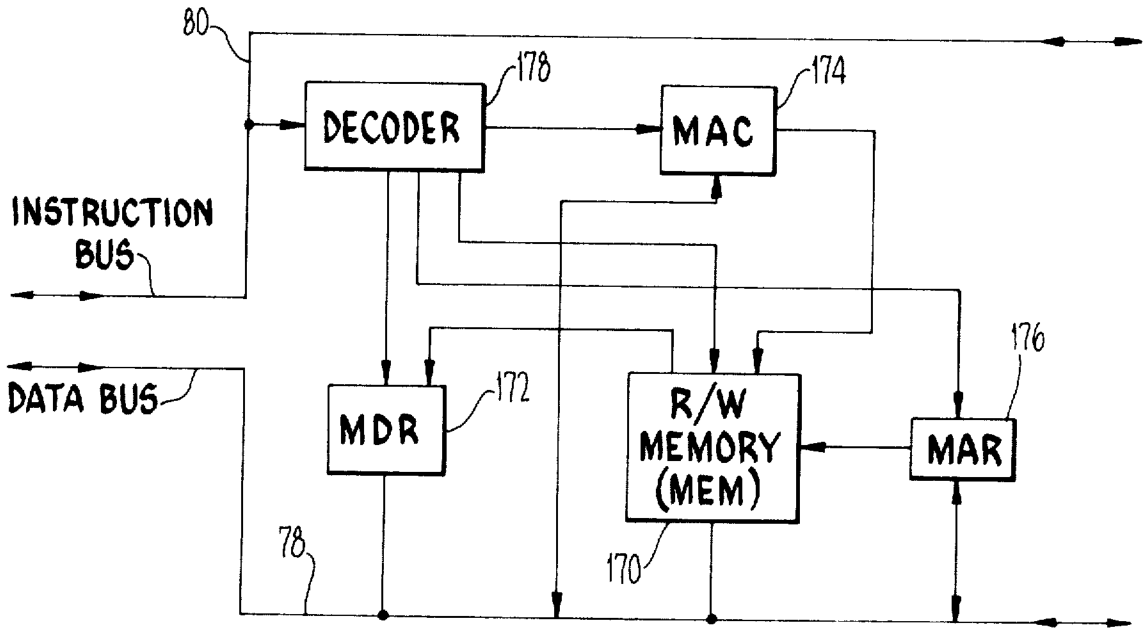
Figure 16C:
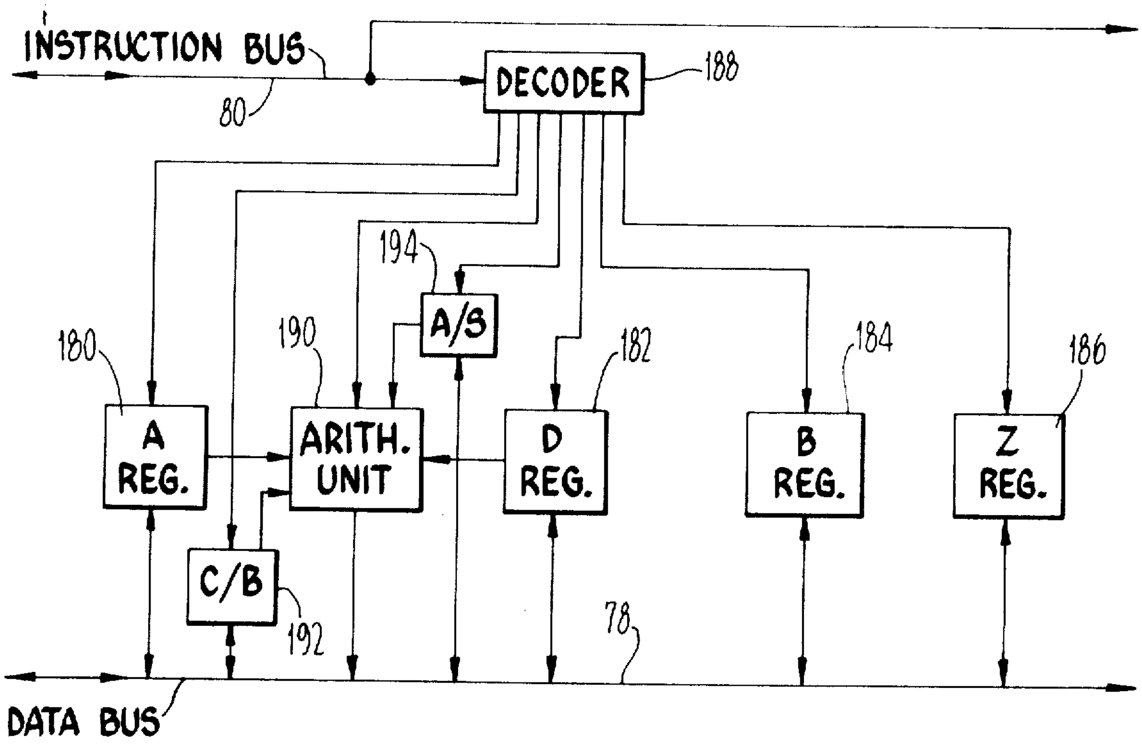

A "MOVE" instruction, like that in location 19 causes the contents of the first-mentioned register (A-register, see FIG. 16*c*) to be moved into the second-mentioned register (B-register, FIG. 16*c*). The next instruction to be executed following a "MOVE" instruction is located in the next sequencer location.

A "SET" instruction, like that found in location 9, executed by setting the mentioned decimal number (48) into the mentioned register (A-register). The next instruction executed is in the next sequential location.

A "GO TO" instruction, like that found in location 1, is an unconditional branch or jump instruction which causes a jump to the specified sequencer location (740). The next instruction executed is in the jumped-to location.

An "IF, GO TO" instruction, like that found in location 10, is a conditional branch instruction. Execution of this instruction is accomplished by automatically comparing the contents of a D-register (FIG. 16*c*) with the contents of an A-register (the contents of the D-register are subtracted from the A-register). If the contents of the A-register are less than the contents of the D-register, the sequencer branches to the specified location (502) and then proceeds to execute the thus branched-to instruction; however, if the contents of the A-register are not less than the contents of the D-register, the next instruction is in the next sequential location that follows the conditional branch instruction.

A "Return-Index" instruction, like that found in location 834, is executed by effecting a jump to the instruction location in the other half of the sequencer 154 (sequencer halves were described previously) that follows that instruction in such other half of the sequencer which effected being in the sequencer half containing such Return-Index instruction.

For example, the instruction in location 0 (location 0 is in the first half of the sequencer) causes a jump to location 908 which location is in the second half of the sequencer; instructions in locations 908–915 are then sequentially executed. The instruction in location 915 causes a jump to location 828 which is still in the second half of the sequencer. The instructions in locations 828–833 are then sequentially executed. At location 833 (an IF, GO TO instruction) if the contents of the A-register are not less than the contents of the D-register, the instruction next to be executed is the Return-Index instruction in location 834. Now, the Return-Index instruction in location 834 will effect a jump to location 1, which is the location next following the location in the sequencer's other half which effected a jump to the sequencer half that the Return-Index instruction is located in.

An "If, Return-Indexed" instruction, like that in location 633, is a conditional branch instruction that is executed like the ordinary "IF, GO TO" instruction discussed above. However, in executing the "If, Return-Indexed" instruction, if the contents of the A-register are less than the contents of the D-register a "Return-Indexed" instruction is executed, i.e., a jump to the instruction location in the other half of the sequencer immediately following the location in such other sequencer half that effected a jump to the sequencer half that contains such "If, Return-Indexed" instruction.

An INC (increment) instruction, such as in location 806, will add a decimal "1" to the contents of the register set forth in the instruction.

A DEC (decrease) instruction, such as in location 443, will subtract a decimal "1" from the register specified in the instruction.

A NOP instruction, such as in location 105, will do no operation other than step or advance to the next sequential location.

A MOVE BAPD instruction, such as in location 237, will cause the contents of A, in the binary coded form, to be added to the contents of D in binary coded form in an arithmetic unit (FIG. 16*c*) and will automatically effect transfer of the sum to the register specified in the instruction. For example, in the instruction shown in location 237, the result of adding A-register plus the D-register in binary form will be transferred to a memory at a particular location.

Likewise, a MOVE BAMD instruction such as that found in location 144 will automatically cause the contents of the D-register to be subtracted from the contents of the A-register in the arithmetic unit and the result (difference) in binary form will be automatically transferred to the memory at a location specified by the MAC register and MAR register.

A BCDALG instruction, such as shown in location 488, will cause the algebraic operation of addition or subtraction, in binary coded decimal form as determined by a A/S unit, of the contents of the D-register with the contents of the A-register and the result to be automatically placed in the specified register.

Location selection or addressing is accomplished in the present invention in the manner now to be described.

In FIG. 16*a*, there is shown a group/subgroup selector 156. The group/subgroup selector may be any bistable device which can be switched to one or the other of its two stable states by an appropriate signal from an instruction decoder 158.

Output signals from the group/subgroup selector are furnished to a group location selector 160 and a subgroup location selector 162 for enabling one and disabling the other location selector as will be described in more detail below.

The group location selector 160 and subgroup location selector 162 may comprise counters which are advanced by one count by input pulses when enabled and can be preset to a particular count.

Each of the location selectors 160 and 162 also have an input signal from a branching control unit 164 which is controlled by a Binary Borrow signal from the arithmetic unit (FIG. 16*c*) when a conditional jump instruction (an IF, GO TO instruction) is executed. Generally speaking, the output signal from branching control unit 164 determines which of the selector units 160 or 162 is to be active or effective for selecting the next location in the sequencer 154.

Normally the main group selector and subgroup selector are initially at a count of zero and a count of 512 respectively.

The count of zero in the main group selector 160 will cause the instruction in location "0" (the first location) of the sequencer 154 to be read when the main group selector 160 is activated by appropriate read signals.

The contents of location "0" are caused to be read into an instruction register 166 and the contents of the main group selector are then advanced by a count of one.

The decoder 158 decodes the instruction in the register 166 and transmits an appropriate instruction code over instruction bus 80 to effect operation of the other units of the system and an appropriate set of data signals over data bus 78 to the appropriate system units if data is part of the instruction.

When the instruction is completed the main group selector 160 is caused to access the location now defined by the count in such selector (it will be recalled that the main group selector now contains a count one greater than previously).

The new instruction in the new accessed location is read into the instruction register 166 and the main group selector is advanced by a count of one.

Now, if the instruction in the instruction register 166 is a GO TO, or unconditional jump instruction, the decoder 158 transmits a code defining the address or location to be jumped to over a signal channel 168 to the inputs of the main group, and subgroup selectors 160 and 162.

The decoder 158 also determines if the new location to be jumped to is in the main group or subgroup portion of the sequencer 154 and transmits an appropriate signal to the group/subgroup selector 156, which, in turn, enables the appropriate location selector.

If the new location to be jumped to is in the same half of the sequencer as the location of the jump instruction being currently executed, the new location code on signal channel 168 will be preset into the appropriate still enabled location selector 160 or 162; i.e., the same location selector that accessed the jump instruction. Thus, the enabled location selector is preset with a new location defining code. The location defining code in the other location selector 160 or 162 whatever it may be, is not changed.

Now, the instruction in the location defined by the new preset location code in the enabled location selector is transmitted to the instruction register 166 and the contents of the enabled location selector are advanced by one. The new instruction in the instruction register is then executed.

However, if the unconditional jump instruction decoded in decoder 158 defines a jump to the other half of the sequencer, the group/subgroup selector 156 enables the other location selector 160 or 162.

The code defining the new location to be jumped to is transmitted from the decoder 158 to the location selectors 160 and 162. Now that location selector that is newly enabled accepts the new location defining code and thus such location selector is preset with a new location defining code.

The contents of the disabled location selector remain as before.

The new instruction contained in the location accessed by the newly enabled location selector is transmitted to the instruction register 166 and action proceeds to execute the instruction.

When an IF, GO TO instruction is decoded in the decoder 158, a signal is transmitted from the decoder 158 to the group/subgroup selector 156 and the branching control 164, thereby placing the branching control in a condition to be responsive to the possible occurrence of a binary borrow signal (BB) on a lead 162 from a carry/borrow unit 192 (FIG. 16*c*). The group/subgroup selector 156 does not cause any effect at this time.

The code defining the location to be jumped or branched to, if the contents of the A-register are less than the contents of the D-register, is present on channel 168 at the input of the location selectors 160 and 162; however, this location code is not entered into a location selector at this time, if at all.

Upon receipt of the IF, GO TO instruction code on instruction bus 80, the arithmetic unit 190 (FIG. 16*c*) will cause the contents of the D-register to be subtracted from the A-register. If the original contents of the D-register are greater than the original contents of the A-register, a binary borrow (BB) signal will be placed in the carry/borrow unit 192 and will be transmitted to branching control unit 164 (FIG. 16*a*).

The binary borrow signal will cause the enabled branching control 164 to transmit a branch or jump command signal to location selectors 160 and 162 and the group/subgroup selector 156 thus fully enabling the required location selector; the location to be jumped to is entered into the appropriate enabled location selector 160 or 162 and further program execution proceeds as described previously.

However, if the original contents of the A-register were not less than the original contents of the D-register, no binary borrow signal is generated and thus the program does not jump to a new location but proceeds to the next sequential location.

When the instruction in register 166 is decoded as a Return-Index instruction, a signal is transmitted from the decoder 158 to the selector 156 which, in turn, disables the location selector that causes reading of the Return-Index instruction and enables the other location selector. The newly enabled location selector will access the location defined by the code in such newly enabled location selector and the instruction in such new location will be executed in the usual manner.

It can be appreciated that the Return-Index instruction and location selector logic operation provides for return to the one half of the sequencer after a jump instruction (conditional or unconditional) causes a jump to the other half of the sequencer, and such return to the one half of the sequencer is at the next sequential location following the location where the jump instruction is located.

All information from the various locations in a R/W-memory (MEM) 170 (FIG. 16*b*) is read out of such memory by way of a memory data register (MDR) 172. In other words, all data read out of a location in the R/W-memory is read into the MDR and the contents of such location in the R/W-memory is cleared or lost. In order to restore the lost contents of a location in the R/W-memory, the contents of the MDR-register are written into the location; the contents of the MDR are not destroyed when written into the MEM 170 or other units of the system.

A location in the R/W-memory is defined or specified by rows and columns as shown in table II.

TABLE II

R/W MEMORY (MEM)

Columns

| 15 14 13 12 | 11 10 9 8 | 7 6 5 4 3 2 1 | 0 | ROW |
|---|---|---|---|---|
| Subtotal Des. – S + S | Cust. Key Des. A C C T | Temporary "P" Total (cash received) | +/- | 0 |
| Total Descr. – T + T | Void Key Descr. V O I D | "J" Total (Tax) | +/- | 1 |
| Cash Key Descr. C A | Stock Key Descr. M D S E | Temporary "CKR" Total | +/- | 2 |
| Chg. Key Descr. E A C H | Non-Merch. Key M I S C | "Q" Total Discount | +/- | 3 |
| Amount Key Des. – + | Dept. Key Des. D E P T | TRANSACTION TOTAL | +/- | 4 |
| Other Key Des. M E M O | Quantity Key Des. Q T Y | "P" Total (Cash Received) | +/- | 5 |
| Disc. Key Des. D I S C | Tax Key Des. T A X | Temporary "J" Total (Tax) | +/- | 6 |
| Paym. Key Des. P Y M T | Salesper. Key Des. E M P | "CKR" Total (Sales) | +/- | 7 |
| Tax Factor | | Temporary "Q" Total (Discount) | +/- | 8 |
| NKC Codes | | | | 9 |
| Keyboard Programming Area MAX DIG, verify, entry requirements | | | | 10 |
| Disc. Factor | "mode code" | | | 11 |
| STX P Consecutive No. | Transaction Number Terminal Identification No. | | | 12 |
| | | | | 13 |

| | | | | ROW |
|---|---|---|---|---|
| Transaction Transmission Area | | | | 14-25 |
| | | | | 26 |
| Multiplier | Next avail. Trans. Area No. MAC MAR | Date Storage | | 27 |
| Print Buffer | | | | 28 |
| Print Buffer | | | | 29 |
| Entry Buffer | | | | 30 |
| Last Amount Printed Buffer | | | | 31 |
| 15 14 13 12 | 11 10 9 8 | 7 6 5 4 3 2 1 | 0 | |

Prior to the writing into or reading out of data from any location in the R/W-memory, such location must be specified by entry of a column address into a memory address column (MAC) register 174, and entry of a row address into a memory address row (MAR) register 176.

Entry of addresses into the MAR- and MAC-registers is accomplished by a decoder unit 178 recognizing an appropriate instruction (a SET instruction) on the instruction bus 80 from the instruction register 166 (FIG. 16*a*) and then data via data bus 78 specifying the row or column. This is done for both the row and column.

With data (row and column addresses) now defining a location in the R/W-memory, a MOVE MEM into MDR-insruction via the instruction bus 80 from the decoder 158 (FIG. 16*a*) effects transfer of the defined location's contents to the MDR-register.

Now the data in the MDR may be transferred to any of the various registers of the system by an appropriate MOVE instruction.

In FIG. 16*c*, there is shown the basic data-handling units of the present invention. The A-register 180, D-register 182, B-register 184, and Z-register 186 are each individually connected with the data bus 78 and an instruction decoder 188; data may be transferred between these registers and other units of the present invention upon receipt of a suitable command or instruction in the decoder unit via instruction bus 80.

The A-register 180 and D-register 182 can transfer their contents directly into the arithmetic unit 190 upon various arithmetic instructions being decoded by the instruction decoder 188.

A carry/borrow register (C/B) 192 is provided to accept and store a carry digit from the arithmetic unit when two digits and any previous carry digits are added together in the arithmetic unit. In addition, it is possible, upon a suitable instruction received and decoded in the decoder unit to cause a "carry" digit to be entered or preset into the C/B-register 192 from the data bus 78. Further, the contents of the C/B-register may be transmitted to other units of the present invention of the data bus 78.

An add/subtract control unit (A/S) 194 controls the algebraic operation to be performed by the arithmetic unit on the contents of the A-register and D-register. The A/S unit may be a bistable device which causes the arithmetic unit to perform an add operation when in one of its states and which causes the subtract operation (the contents of the D-register from the contents of the A-register) when in the other state. The A/S unit may be preset to one or the other of its states by an appropriate instruction on the instruction bus and data on the data bus. Further, the state of the A/S unit may be transmitted as data to other units via the data bus by means of an appropriate instruction.

Programming of the present invention consists of first determining what sequence of function keys for entering and acting on a complete transaction is desired or required and determining, for each function key to be operated in the transaction, certain prerequisites or data entry requirements that must be met before operation of the individual function keys will effect their intended function.

After determining what sequence of function key operation is desired, the entry requirements for each key are determined. The entry requirements that may be specified are the maximum number of digits in a data entry by way of the digit keys just prior to operation of each individual function key, and whether any digit keys at all need be operated prior to operation of the individual function keys, and further if the last digit entered by way of the digit keys prior to operation of the function key need be a check digit and, if so, if such check digit be for checking by the modulo "10" or modulo "11" scheme. Such checking schemes are well known in the art and will not herein be described in further detail.

Programming for each key is accomplished by entering, by way of operation of the digit keys, a series of nine decimal digits which are a program for the function key to be depressed just subsequent to operation of the ninth or least significant digit of the set of nine digits, and then depressing the required or desired function key.

In table III below there is set forth at the right nine possible combinations of keys to be rendered effective and keyboard lamps to be lit that may be desired to follow operation of any function key; this is called next-keyboard-condition or NKC. At the left in table III there is set forth the digit key that must be operated as the first or most significant digit of the nine digit program to define the NKC for the function key being programmed.

TABLE III

| NKC Digit (Most significant digit) ($d_1$) | Next function key(s) to be rendered operative and have its lamp turned on. |
|---|---|
| 1 | Sales Person (A) |
| 2 | Cash (E)<br>Charge (F) Other (M) |
| 3 | Customer (B) |
| 4 | Dept. (C) |
| 5 | Stock keeping unit (K)<br>Nonmerchandise (R) |
| 6 | Add (L)<br>Subtract (S) Other (M) |
| 7 | Dept. (C)<br>Nonmerchandise (R)<br>Stock keeping unit (K) |
| 8 | Void (G) |
| 9 | Add (L)<br>Subtract (S) |

Thus, if it is desired to have salesperson function key (A) be operative and have its lamp turned on following any particular function key operation, the digit key "1" is operated as the first digit of a nine-digit program code for the particular function key being programmed.

The next two digits of a nine-digit program define the maximum number of digits that may be entered prior to operation of the particular function key being programmed when operated in the normal operate mode of operation.

Table IV

| Program Code 2nd Digit ($d_2$) | 3rd Digit ($d_3$) | Maximum number of digits to be entered |
|---|---|---|
| 1 | 0 | zero (function key to be used without prior digit entry) |
| 1 | 1 | one |
| 1 | 2 | two |
| 1 | 3 | three |
| 1 | 4 | four |
| 1 | 5 | five |
| 1 | 6 | six |
| 1 | 7 | seven |
| 1 | 8 | eight |
| 1 | 9 | nine |
| 5 | 6 | ten |
| 5 | 7 | eleven |
| 5 | 8 | twelve |
| 5 | 9 | thirteen |

In order to determine what digit keys must be operated to enter the second and third digits of a function key program, the following formula is used:

$$d_2 \text{ and } d_3-1=M$$

where $d_2$ is the cardinal value if the second digit, $d_3$ is the cardinal value of the third digit and M is the maximum number of digits to be entered. In table IV set forth above, there is shown a typical set of second and third digits ($d_2$ and $d_3$) to be entered in a function key's program for any of the 14 possible maximum digit entry requirements. Other values satisfying the formula set forth above may be utilized. For example, if it is desired to restrict the digit entry requirement to a maximum of two digits, the digit key for "2" and then the digit key for "1" may be operated as the second and third digits, respectively, of the program. Operation of the digit keys "3" and "0" or "0" and "3" as the second and third digits of a function key program will also set the restriction of a maximum two digits for the function key during normal operation.

The remaining, or least significant, six digits of the nine-digit program are used to define further prerequisites. If there need be no digits entered prior to operation of the particular function key during normal operation of that key, a set of six aughts are entered as the last six digits of the program for that particular function key. An example of a function key that should have no digit entry requirement would be the Total key.

If it is desired to require that at least one digit be entered from the digit keys prior to operation of a particular function key during normal operation of that particular function key, two 8's and four aughts must be entered as the last six digits of the program for the particular function key. It does not matter which digit positions of the last six digit positions of the program contain the two 8's and four aughts; the instructions in the sequencer of the processor will interpret the last six digits of the function key's program as a unit rather than each digit location separately.

In programming a function key, caution must be used so as not to cause a conflict between the "zero" maximum digits restriction code in program digit positions two and three (digit code "10" or "01") and "digit entry required" code in the last six programming positions, it should be clear that the two are contradictory. Thus, if a "zero" maximum digits code is set in positions two and three of the program, the last six positions of the program must contain all aughts.

If it is desired to require that the digits required to be entered prior to normal operation of a particular function key have a last or least significant digit that is a correct modulo-10 check digit, the last six positions of the program for the particular function key must contain four 8's and two aughts.

If it is desired to require that the digits required to be entered prior to normal operation have a last, or least significant, digit that is a modulo-11 check digit, each of the last six positions of the program for the particular function key must contain an "8." In table V below, there is shown typical codes or digits for the last six positions of a function key program.

TABLE V

| Last Six Digit Positions | Program Requirements |
|---|---|
| 0 0 0 0 0 0 | None |
| 8 8 0 0 0 0 | Digit entry required. |
| 8 8 8 8 0 0 | Digit must be entered and last digit must be modulo-ten check digit. |
| 8 8 8 8 8 8 | Digits must be entered and last digit must be modulo-eleven check digit. |

To clear or remove the program for any particular function key without entering a new program for that function key is accomplished by merely operating the function key without entering any program digits for that function key when in the program mode of operation.

After the nine-digit program for a particular function key has been entered, the function key is depressed or operated. This causes the nine program digits to be printed out on the word that identifies the function key.

When the mode switch 290 (FIG. 11) is moved to its third or OPERATE position, and the program control switch 294 (FIG. 12) is in its OFF position, the keyboard lamps associated with the next keyboard condition code of the program associated with the VOID function key (and TOTAL function key) will be turned on.

Now, normal operation may proceed. Data entered by operation of the digit keys prior to operation of any of the function keys will be entered into the Entry Buffer section of the R/W-memory.

If the data in the entry buffer of the R/W-memory does not meet the digit entry requirements of the program associated with the sales person function key, the lamp associated with the sales person key is turned off and the lamp associated with the Reenter function key (key H) is turned on. (See description below for operation of the Reenter function key).

If the data in the entry buffer section of the R/W-memory meets the digit entry requirements of the program associated with the sales person function key, the contents of the entry buffer section of the R/W-memory is transferred to the print buffer section of the R/W-memory.

When the mode switch 290 (FIG. 11) is moved to its fourth or CLOSE position, all functions are automatic as controlled by the sequencer.

What is claimed is:

1. A retail sales transaction terminal comprising:

a plurality of manually operable digit keys for entering numeric data into said terminal;

means operatively coupled to said digit keys for generating data signals indicative of the digit key operated;

a plurality of manually operable function keys for entering functional data into said terminal;

means operatively coupled to said function keys for generating data signals indicative of the function key operated;

sequencing means operatively coupled to both said means for generating data signals indicative of operated digit and function keys;

said sequencing means having a plurality of stored instructions for effecting predetermined operations in said terminal;

said sequencing means having a first output coupled to a first common bus and a second output coupled to a second common bus with instruction data appearing on said first common bus and other data appearing on said second common bus;

a memory coupled between said first and second common bus and having a plurality of storage locations;

instruction decoding means coupled to said first bus for entering certain of said data signals into certain locations in said memory; and an arithmetic unit electrically coupled between said first and second bus which performs arithmetic operations on certain numeric data under control of certain said instructions.

2. The transaction terminal according to claim 1 wherein:

said plurality of instructions are divided into two groups;

selector means coupled to said sequencing means and normally operating to effect the execution of a first sequence of successive ones of said instructions in a group;

said selector means being responsive to certain instructions in said first sequence for initiating the execution of a second sequence of instructions in either of two groups;

said selector means including means responsive to certain instructions in said second sequence for initiating the execution of a third sequence of instructions starting at the instruction immediately following the instruction that initiated said second sequence.

3. The transaction terminal according to claim 2 wherein:

the execution of certain said instructions generates a first and second code;

said arithmetic unit includes means for comparing the value of said first and second codes;

said means for comparing providing an output which is coupled to said selector means to cause said selector means to continue effecting the execution of successive instructions when the first code is at least equal to the value of the second code and to effect the execution of another sequence of successive instructions when the value of said first code is less than the value of said second code.

4. The transaction terminal according to claim 2 wherein said selector means includes:

an instruction register coupled to said means for temporarily storing individual ones of said instructions therein;

at least some of said instructions including other data such as numeric data, address locations and the like;

a decoder having its input coupled to said instruction register and a first output coupled to said first common bus and a second output coupled to said second common bus for decoding said instructions in said instruction register and applying instruction data only to said first common bus and other data to said second common bus.

5. The transaction terminal according to claim 4 wherein:

said plurality of instructions stored in said sequencing means are divided into two groups; and group selecting means coupled to said decoder cause individual instructions from either of said two instruction groups to be entered into said instruction register in response to data appearing in said decoder.

6. The transaction terminal according to claim 1 wherein said arithmetic unit includes:

a plurality of registers coupled to said second common bus;

a decoder coupled between said first common bus and said plurality of registers and responsive to certain instruction data appearing on said first common bus for enabling transfer of data between various ones of said registers and between said memory and said registers by way of said second bus.

7. The transaction terminal according to claim 6 wherein:

said arithmetic unit performs arithmetic operations on data in two of said registers.

8. The transaction terminal according to claim 6 further including:

multidigit display means coupled to said second common bus;

decoder means coupled between said first common bus and said display means for enabling the visual display by said display means of data in at least one of said registers in response to certain instruction data appearing on said first common bus.

9. The transaction terminal according to claim 1 wherein:

at least some of said function keys have key illumination means associated therewith;

said memory including stored data indicative of which ones of said function keys are to be next operated after execution of a certain function;

said illumination means being responsive to said data in said memory to enable the illumination means associated with the function key next to be actuated to be energized in response to the execution of a certain function.

10. The transaction terminal according to claim 1 further including:

a cash drawer having a closed and an open position;

cash drawer opening means coupled to said first common bus and responsive to certain data appearing on said first common bus for opening said cash drawer.

11. The transaction terminal according to claim 1 further including:

a data receiving and transmitting device coupled between said first and second common bus for transferring data from said terminal to a peripheral device and to enter data from said peripheral device into said transaction terminal.

12. The transaction terminal according to claim 11 wherein said data receiving and transmitting device includes:

a shift register having a parallel input coupled to said second common bus and a serial output adapted to be received by said peripheral device; and a decoder coupled between said shift register and said first common bus for entering data on said second common bus into said shift register in response to certain instruction data appearing on said first common bus.

13. An apparatus according to claim 1 wherein at least said digit keys enable predetermined data codes to be entered into said memory which codes are indicative of the maximum number of digit keys that may be operated immediately prior to operation of predetermined ones of said function keys.

14. An apparatus according to claim 1 wherein at least said digit keys enable predetermined data codes to be entered into said memory which codes are indicative of a requirement for operation or no operation of said decimal digit keys immediately prior to operation of predetermined ones of said function keys.

15. An apparatus according to claim 1 wherein at least said digit keys enable predetermined codes to be entered into said memory which codes are indicative of a requirement for operation of decimal digit keys including entry of a check digit immediately prior to operation of predetermined ones of said function keys.

16. The transaction terminal according to claim 1 wherein:

both said means for generating data signals indicative of operated digit and function keys are coupled to said sequencing means by way of said first and second bus.

* * * * *